US012683671B2

(12) United States Patent
Ryu et al.

(10) Patent No.: US 12,683,671 B2
(45) Date of Patent: Jul. 14, 2026

(54) CROSS-BEAM COUPLING REPORTING

(71) Applicant: QUALCOMM Incorporated, San Diego, CA (US)

(72) Inventors: Jae Ho Ryu, San Diego, CA (US); Changhwan Park, San Diego, CA (US); Ruhua He, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 18/403,309

(22) Filed: Jan. 3, 2024

(65) Prior Publication Data

US 2024/0267106 A1 Aug. 8, 2024

Related U.S. Application Data

(60) Provisional application No. 63/483,863, filed on Feb. 8, 2023.

(51) Int. Cl.
*H04B 7/06* (2006.01)
*H04B 17/318* (2015.01)

(52) U.S. Cl.
CPC ....... *H04B 7/06952* (2023.05); *H04B 17/328* (2023.05)

(58) Field of Classification Search
CPC .......................... H04B 7/06952; H04B 17/328
See application file for complete search history.

(56) References Cited

U.S. PATENT DOCUMENTS

| | | | | |
|---|---|---|---|---|
| 2021/0160707 A1* | 5/2021 | Suzaki | ................. | H04B 7/0617 |
| 2021/0167821 A1* | 6/2021 | Chen | .................... | H04B 7/0617 |
| 2021/0211176 A1 | 7/2021 | Gao et al. | | |
| 2021/0351831 A1* | 11/2021 | Venugopal | ........... | H04B 7/0695 |
| 2022/0140960 A1* | 5/2022 | Gao | ...................... | H04L 5/0073 370/336 |
| 2022/0239361 A1* | 7/2022 | He | ........................ | H04B 17/336 |
| 2024/0267106 A1* | 8/2024 | Ryu | ................... | H04B 7/06952 |
| 2024/0283513 A1* | 8/2024 | Bi | .......................... | H04B 7/063 |
| 2024/0305423 A1* | 9/2024 | Lyazidi | ................. | H04L 5/0051 |

FOREIGN PATENT DOCUMENTS

WO 2020037207 A1 2/2020

OTHER PUBLICATIONS

International Search Report and Written Opinion—PCT/US2024/010548—ISA/EPO—May 6, 2024.
(Continued)

*Primary Examiner* — Jaison Joseph
(74) *Attorney, Agent, or Firm* — Harrity & Harrity LLP/QUALCOMM Incorporated

(57) ABSTRACT

Various aspects of the present disclosure generally relate to wireless communication. In some aspects, an apparatus may receive, via a receive beam, a first reference signal from a first transmission reception point (TRP). The apparatus may receive, via the receive beam, a second reference signal from a second TRP. The apparatus may transmit an indication of a difference between a first measurement of the first reference signal and a second measurement of the second reference signal. Numerous other aspects are described.

30 Claims, 25 Drawing Sheets

900

910 Transmit a first reference signal for a user equipment (UE)

920 Receive, from the UE, an indication of a difference between a first measurement of the first reference signal and a second measurement of a second reference signal associated with a second network node

(56)             References Cited

OTHER PUBLICATIONS

3GPP: "3rd Generation Partnership Project, Technical Specification Group Radio Access Network, NR, Radio Resource Control (RRC) Protocol Specification (Release 17)", 3GPP TS 38.331, V17.3.0, Dec. 2022, pp. 1-1315.

3GPP: "3rd Generation Partnership Project, Technical Specification Group Radio Access Network, NR, Requirements for Support of Radio Resource Management (Release 18)", 3GPP TS 38.133, V18.0.0, Dec. 2022, 5242 Pages.

Qualcomm Incorporated: "New| WID: Requirement for NR frequency Range 2 (FR2) Multi-Rx Chain DL Reception", RP-220974 (revision of RP-220057), 3GPP TSG RAN Meeting #95e, Electronic Meeting, Mar. 17-23, 2022, 5 Pages.

* cited by examiner

810 Receive, via a receive beam, a first reference signal from a first transmission reception point (TRP)

820 Receive, via the receive beam, a second reference signal from a second TRP

830 Transmit an indication of a difference between a first measurement of the first reference signal and a second measurement of the second reference signal

800

900

910 Transmit a first reference signal for a user equipment (UE)

920 Receive, from the UE, an indication of a difference between a first measurement of the first reference signal and a second measurement of a second reference signal associated with a second network node 1610 Obtain a first reference signal for a user equipment (UE)

1620 Provide an indication of a difference between a first measurement of the first reference signal and a second measurement of a second reference signal associated with a second network node

1600

CROSS-BEAM COUPLING REPORTING

CROSS-REFERENCE TO RELATED APPLICATION

This Patent Application claims priority to U.S. Provisional Patent Application No. 63/483,863, filed on Feb. 8, 2023, entitled "CROSS-BEAM COUPLING REPORTING," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for reporting in a wireless network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication. The apparatus may include one or more memories and one or more processors coupled to the one or more memories. The one or more processors may be configured to cause the apparatus to receive, via a receive beam, a first reference signal from a first transmission reception point (TRP). The one or more processors may be configured to cause the apparatus to receive, via the receive beam, a second reference signal from a second TRP. The one or more processors may be configured to cause the apparatus to transmit an indication of a difference between a first measurement of the first reference signal and a second measurement of the second reference signal.

Some aspects described herein relate to a first apparatus for wireless communication. The first apparatus may include one or more memories and one or more processors coupled to the one or more memories. The one or more processors may be configured to cause the apparatus to transmit a first reference signal for a UE. The one or more processors may be configured to cause the apparatus to receive, from the UE, an indication of a difference between a first measurement of the first reference signal and a second measurement of a second reference signal associated with a second apparatus.

Some aspects described herein relate to a method of wireless communication performed by an apparatus at a UE. The method may include receiving, via a receive beam, a first reference signal from a first TRP. The method may include receiving, via the receive beam, a second reference signal from a second TRP. The method may include transmitting an indication of a difference between a first measurement of the first reference signal and a second measurement of the second reference signal.

Some aspects described herein relate to a method of wireless communication performed by an apparatus at a network node. The method may include transmitting a first reference signal for a UE. The method may include receiving, from the UE, an indication of a difference between a first measurement of the first reference signal and a second measurement of a second reference signal associated with a second network node.

Some aspects described herein relate to a non-transitory computer-readable medium that stores a set of instructions for wireless communication. The set of instructions, when executed by one or more processors of an apparatus, may cause the apparatus to receive, via a receive beam, a first reference signal from a first TRP. The one or more instructions, when executed by one or more processors, may cause the apparatus to receive, via the receive beam, a second reference signal from a second TRP. The one or more instructions, when executed by one or more processors, may cause the apparatus to transmit an indication of a difference between a first measurement of the first reference signal and a second measurement of the second reference signal.

Some aspects described herein relate to a non-transitory computer-readable medium that stores a set of instructions for wireless communication by a first apparatus. The set of instructions, when executed by one or more processors of the first apparatus, may cause the first apparatus to transmit a first reference signal for a UE. The set of instructions, when executed by one or more processors of the first apparatus, may cause the first apparatus to receive, from the UE, an indication of a difference between a first measurement of the first reference signal and a second measurement of a second reference signal associated with a second apparatus.

Some aspects described herein relate to an apparatus for wireless communication. The apparatus may include means for receiving, via a receive beam, a first reference signal from a first TRP. The apparatus may include means for receiving, via the receive beam, a second reference signal from a second TRP. The apparatus may include means for transmitting an indication of a difference between a first measurement of the first reference signal and a second measurement of the second reference signal.

Some aspects described herein relate to a first apparatus for wireless communication. The first apparatus may include means for transmitting a first reference signal for a UE. The first apparatus may include means for receiving, from the UE, an indication of a difference between a first measurement of the first reference signal and a second measurement of a second reference signal associated with a second apparatus.

Some aspects described herein relate to a first apparatus for wireless communication. The first apparatus may include one or more memories and one or more processors coupled to the one or more memories. The one or more processors may be configured to cause the apparatus to provide a first reference signal for a UE. The one or more processors may be configured to cause the apparatus to obtain an indication of a difference between a first measurement of the first reference signal and a second measurement of a second reference signal associated with a second apparatus.

Some aspects described herein relate to a method of wireless communication performed by an apparatus at a network node. The method may include providing a first reference signal for a UE. The method may include obtaining an indication of a difference between a first measurement of the first reference signal and a second measurement of a second reference signal associated with a second network node.

Some aspects described herein relate to a non-transitory computer-readable medium that stores a set of instructions for wireless communication by a first apparatus. The set of instructions, when executed by one or more processors of the first apparatus, may cause the first apparatus to provide a first reference signal for a UE. The set of instructions, when executed by one or more processors of the first apparatus, may cause the first apparatus to obtain an indication of a difference between a first measurement of the first reference signal and a second measurement of a second reference signal associated with a second apparatus.

Some aspects described herein relate to a first apparatus for wireless communication. The first apparatus may include means for providing a first reference signal for a UE. The first apparatus may include means for obtaining an indication of a difference between a first measurement of the first reference signal and a second measurement of a second reference signal associated with a second apparatus.

Aspects generally include a method, apparatus, system, computer program product, non-transitory computer-readable medium, user equipment, base station, network entity, network node, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
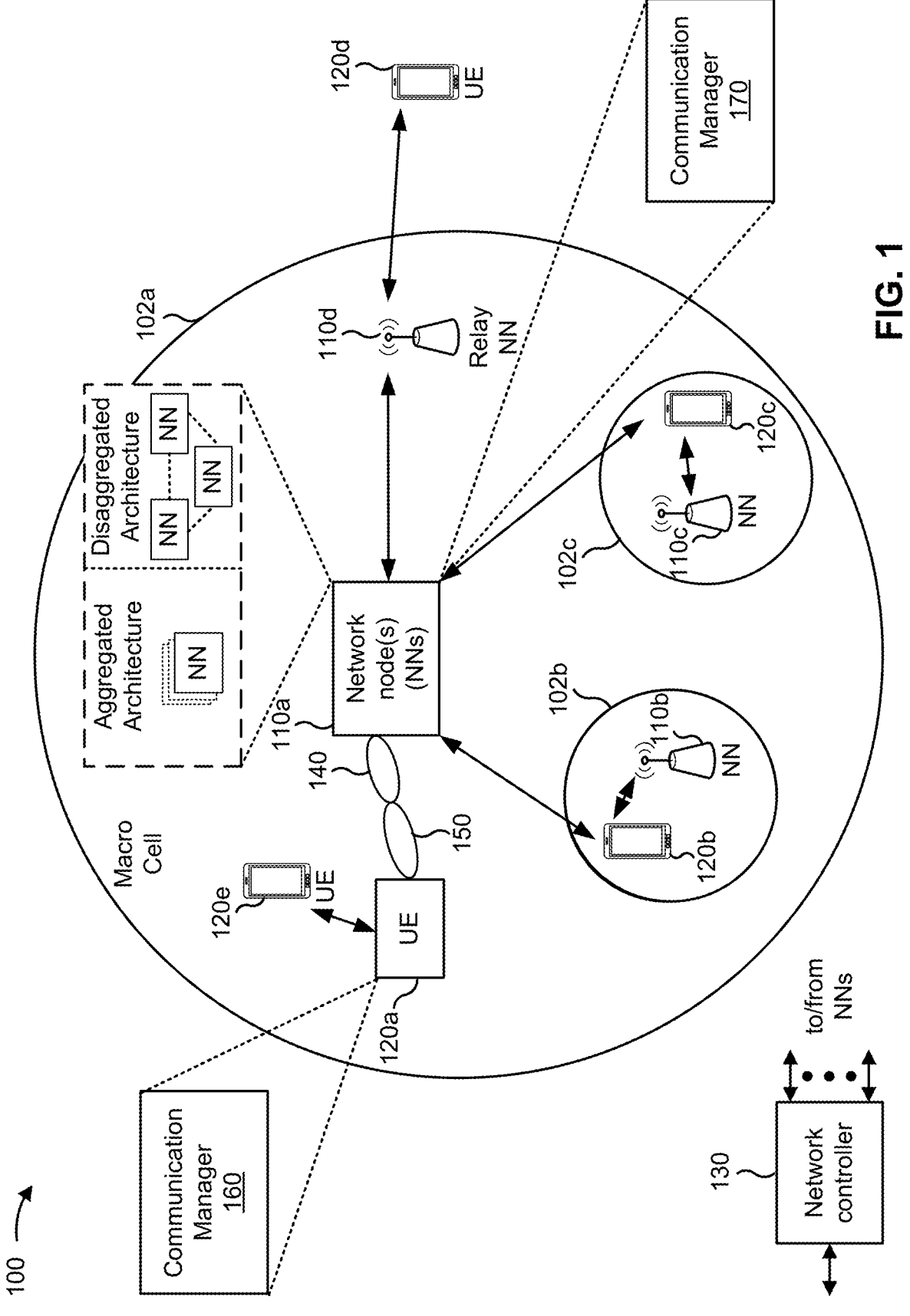
FIG. 1 is a diagram illustrating an example of a wireless network, in accordance with the present disclosure.

In a wireless network, a network node and a user equipment (UE) may communicate via one or more beams. "Beam" may refer to a wireless communication signal that is beamformed and transmitted in a particular spatial direction, as opposed to being transmitted omnidirectionally. The network node and the UE may perform a beam management procedure, which is a procedure that is performed to refine the beams that are used by the network node and the UE for wireless communication in the wireless network. Initially, the network node and the UE may select wide beams for communication, and the network node and/or the UE may perform various measurements and reporting in the beam management procedure to select narrow beams from the wide beams.

"Wide beam" refers to a wireless communication beam that has not been refined and/or that is associated with a small beamforming gain. A wide beam may also be referred to as an unrefined beam (e.g., a beam that has not been selected through a beam refinement procedure). "Narrow beam" refers to a wireless communication beam that is highly directional and has a high beamforming gain relative to a wide beam. A narrow beam may also be referred to as a refined beam. While wide beams may generally provide greater coverage, narrow beams may provide higher throughput and lower latency, among other examples. A wide beam may spread the transmit power of a network node across a greater geographic coverage area relative to a narrow beam. A narrow beam may focus the transmit power of a network node in a relatively small geographic area (e.g., relative to a wide beam), which enables a greater amount of the transmit power (and thus, a greater throughput) to be directed toward a particular UE. Due to the smaller geographic or spatial coverage of a narrow beam relative to a wide beam, a narrow beam may enable a greater quantity of beams to be used, which may provide additional spatial diversity across different beams relative to a wide beam.

In some cases, a UE may be communicatively connected with a plurality of network nodes in a wireless communication network. In these cases, the UE may perform beam management procedures with each of the network nodes to establish beam pairs for each of the network nodes. "Beam pair" refers to a pair of beams that include a transmit beam and a receive beam. The "transmit beam" of the beam pair corresponds to a network node transmit beam, and the "receive beam" of the beam pair corresponds to a UE receive beam. A network node may also include one or more receive beams, and a UE may also include one or more transmit beams.

The beam management procedures that the UE performs with each of the network nodes may be uncoordinated. For example, a first network node and a second network node may each select a preferred transmit beam for communication with the UE without input from the UE as to whether or how significantly the preferred transmit beam of the first network node may affect communication on the preferred transmit beam of the second network node, and vice-versa.

According to one or more examples, the uncoordinated selection of beam pairs for the network nodes may result in cross-beam coupling. "Cross-beam coupling" refers to the reception of a signal transmitted via a transmit beam and received via a receive beam that is configured to receive a different transmit beam. An example of cross-beam coupling may include reception of a signal transmitted via a first transmit beam of the first network node and configured to be received via a first receive beam of a UE, on a second receive beam of the UE that is part of a second beam pair with a second transmit beam of a second network node. Cross-beam coupling may cause interference at the UE with reception of transmissions from the second network node via the second transmit beam and the second receive beam. The interference may result in reduced throughput between the second network node and the UE, increased latency between the second network node and the UE, reduced signal quality between the second network node and the UE, an increase in dropped or unreceived transmissions between the second network node and the UE, and/or an increased rate of retransmissions between the second network node and the UE (which increases the consumption of processing, memory, battery, and/or network resources by the second network node and the UE), among other examples.

As described herein, according to one or more aspects, a UE is configured to report cross-beam coupling measurements to one or more network nodes. In one example, a first network node may transmit a first reference signal via a first transmit beam, and a second network node may transmit a second reference signal via a second transmit beam. The UE may perform measurements of the first reference signal and the second reference signal, as received via a first receive beam of the UE, and may perform measurements of the first reference signal and the second reference signal, as received via a second receive beam of the UE. The UE may transmit a measurement report to the network nodes, where the measurement report indicates a difference between the measurements of the first reference signal and the second reference signal received via the first receive beam, and indicates a difference between the measurements of the first reference signal and the second reference signal received via the second receive beam. These differences are indications of cross-beam coupling from the first transmit beam to the second receive beam, and from the second transmit beam to the first receive beam.

In accordance with one or more aspects, the network nodes may use the cross-beam coupling measurements reported from the UE to perform beam refinement in respective beam management procedures, such as a P1 procedure (e.g., a beam management procedure in which a network node selects a wide beam) and/or a P2 procedure (e.g., a beam management procedure in which a network node selects a narrow beam), among other examples. In particular, the cross-beam coupling measurements reported from the UE enables the first network node and the second network node to perform the respective beam management procedures in a coordinated manner in which the cross-beam coupling associated with the transmit beams of the first network node and the transmit beams of the second network node are considered when the first network node and the second network node select narrow beams for communication with the UE. In this way, the cross-beam coupling measurements reported from the UE may increase throughput between the first network node and the UE, and may increase throughput between the second network node and the UE in that the network nodes may select beams on which the UE experiences less interference. The cross-beam coupling measurements reported from the UE may decrease latency between the first network node and the UE, and between the second network node and the UE. The cross-beam coupling measurements reported from the UE may increase signal quality between the first network node and the UE, and between the second network node and the UE. The cross-beam coupling measurements reported from the UE may decrease the quantity of dropped or unreceived transmissions between the first network node and the UE, and between the second network node and the UE. The cross-beam coupling measurements reported from the UE may decrease the rate of retransmissions between the first network node and the UE (which decreases the consumption of processing, memory, battery, and/or network resources by the first network node and the UE), and between the second network node and the UE (which decreases the consumption of processing, memory, battery, and/or network resources by the second network node and the UE) because of the reduced quantity of dropped or unreceived transmissions.

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6 G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). A processor also may be implemented as a combination of computing devices, for example, a combination of a DSP and a microprocessor, a plurality of microprocessors, one or more microprocessors in conjunction with a DSP core, or any other such configuration. One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6 G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., one or more memories) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

The electromagnetic spectrum is often subdivided, by frequency/wavelength, into various classes, bands, channels, etc. In 5G NR, two initial operating bands have been identified as frequency range designations FR1 (410 MHz- 7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As further shown in FIG. 1, a network node 110 may communicate with a UE 120 via one or more NN transmit beams 140. The UE 120 may communicate with the network node 110 via one or more UE receive beams 150. The one or more NN transmit beams 140 may be wide NN transmit beams, narrow NN transmit beams, or a combination thereof. The one or more UE receive beams 150 may be wide UE receive beams, narrow UE receive beams, or a combination thereof.

In some aspects, a UE 120 may include a communication manager 160. As described in more detail elsewhere herein, the communication manager 160 may receive, via a UE receive beam 150, a first reference signal from a first network node 110; may receive, via the UE receive beam 150, a second reference signal from a second network node 110; and may transmit an indication of a difference between a first measurement of the first reference signal and a second measurement of the second reference signal. Additionally, or alternatively, the communication manager 160 may perform one or more other operations described herein.

In some aspects, a network node 110 may include a communication manager 170. As described in more detail elsewhere herein, the communication manager 170 may transmit a first reference signal for a UE 120; and may receive, from the UE 120, an indication of a difference between a first measurement of the first reference signal and a second measurement of a second reference signal associated with a second network node 110. Additionally, or alternatively, the communication manager 170 may perform one or more other operations described herein.

In some aspects, a network node 110 may include a communication manager 170. As described in more detail elsewhere herein, the communication manager 170 may provide a first reference signal for a UE 120; and may provide an indication of a difference between a first measurement of the first reference signal and a second measurement of a second reference signal associated with a second network node 110. Additionally, or alternatively, the communication manager 170 may perform one or more other operations described herein.

As indicated above, FIG. 1 is provided as an example. Other examples may differ from what is described with regard to FIG. 1.

Figure 2:
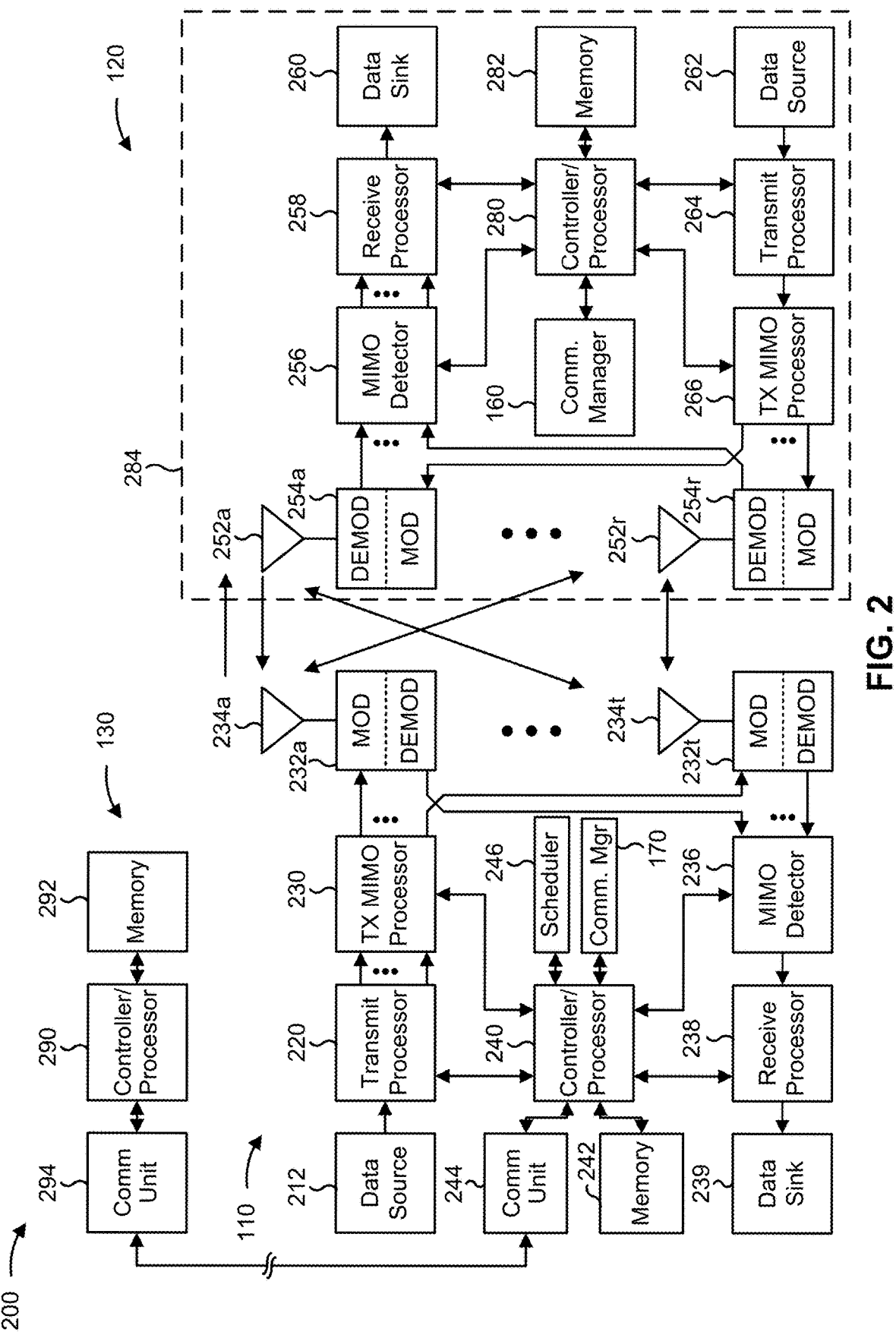
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the network node 110, the controller/processor 280 of the UE 120, and/or any other component(s) of FIG. 2 may perform one or more techniques associated with cross-beam coupling, as described in more detail in connection with FIGS. 6A-6C, 7A-7D, 8, 9, 16, and/or elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, via a receive beam, a first reference signal from a first TRP; means for receiving, via the receive beam, a second reference signal from a second TRP; and/or means for transmitting an indication of a difference between a first measurement of the first reference signal and a second measurement of the second reference signal. The means for the UE 120 to perform operations described herein may include, for example, one or more of communication manager 160, antenna 252, modem 254, MIMO detector 256, receive processor 258, transmit processor 264, TX MIMO processor 266, controller/processor 280, or memory 282.

In some aspects, the network node 110 includes means for transmitting a first reference signal for a UE 120; and/or means for receiving, from the UE 120, an indication of a difference between a first measurement of the first reference signal and a second measurement of a second reference signal associated with another network node 110. The means for the network node 110 to perform operations described herein may include, for example, one or more of communication manager 170, transmit processor 220, TX MIMO processor 230, modem 232, antenna 234, MIMO detector 236, receive processor 238, controller/processor 240, memory 242, or scheduler 246.

In some aspects, the network node 110 includes means for providing a first reference signal for a UE 120; and/or means for obtaining an indication of a difference between a first measurement of the first reference signal and a second measurement of a second reference signal associated with another network node 110. The means for the network node 110 to perform operations described herein may include, for example, one or more of communication manager 170, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
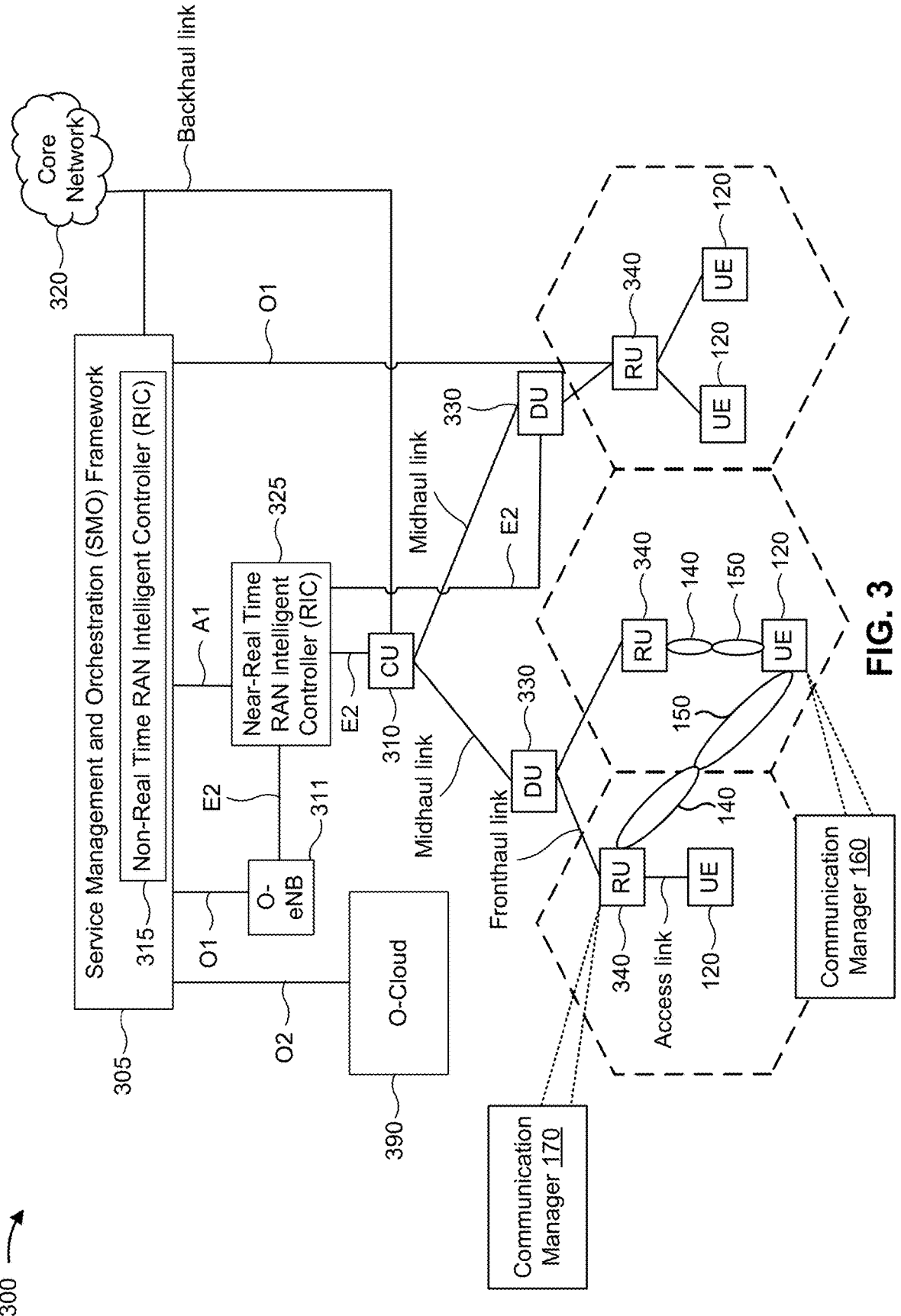
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As further shown in FIG. 3, one or more RUs 340 may communicate with a UE 120 via one or more NN transmit beams 140. The UE 120 may communicate with one or more RUs 340 via one or more UE receive beams 150. The one or more NN transmit beams 140 may be wide NN transmit beams, narrow NN transmit beams, or a combination thereof. The one or more UE receive beams 150 may be wide UE receive beams, narrow UE receive beams, or a combination thereof.

In some aspects, a UE 120 may include a communication manager 160. As described in more detail elsewhere herein, the communication manager 160 may receive, via a UE receive beam 150, a first reference signal from a first RU 340; may receive, via the UE receive beam 150, a second reference signal from a second RU 340; and may transmit an indication of a difference between a first measurement of the first reference signal and a second measurement of the second reference signal. Additionally, or alternatively, the communication manager 160 may perform one or more other operations described herein.

In some aspects, an RU 340 may include a communication manager 170. As described in more detail elsewhere herein, the communication manager 170 may transmit a first reference signal for a UE 120; and may receive, from the UE 120, an indication of a difference between a first measurement of the first reference signal and a second measurement of a second reference signal associated with a second RU 340. Additionally, or alternatively, the communication manager 170 may perform one or more other operations described herein.

As indicated above, FIG. 3 is provided as an example. Other examples may differ from what is described with regard to FIG. 3.

Figure 4A:
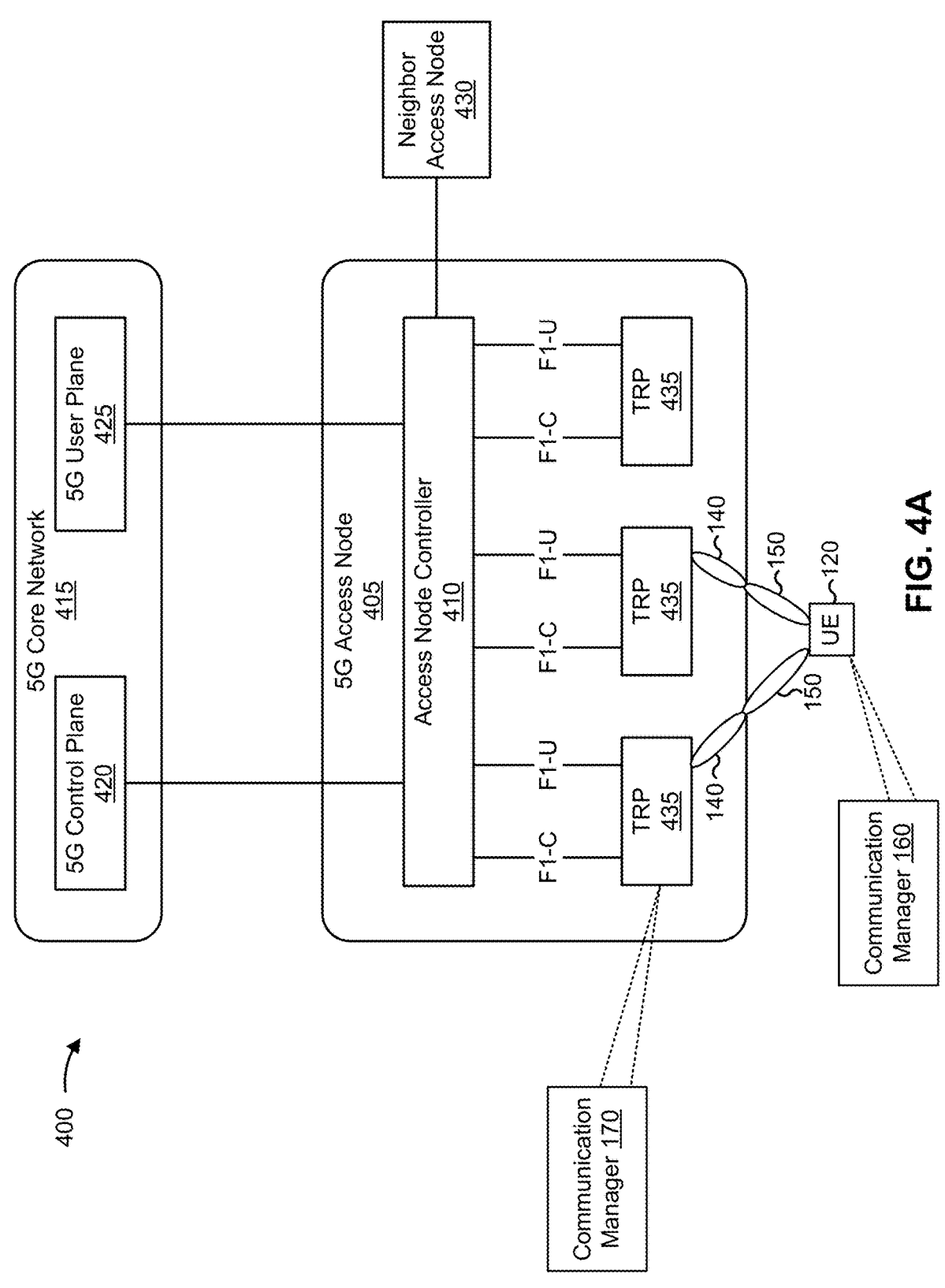
FIGS. 4A and 4B illustrate an example of a logical architecture of a distributed radio access network (RAN), in accordance with the present disclosure.
Figure 4B:
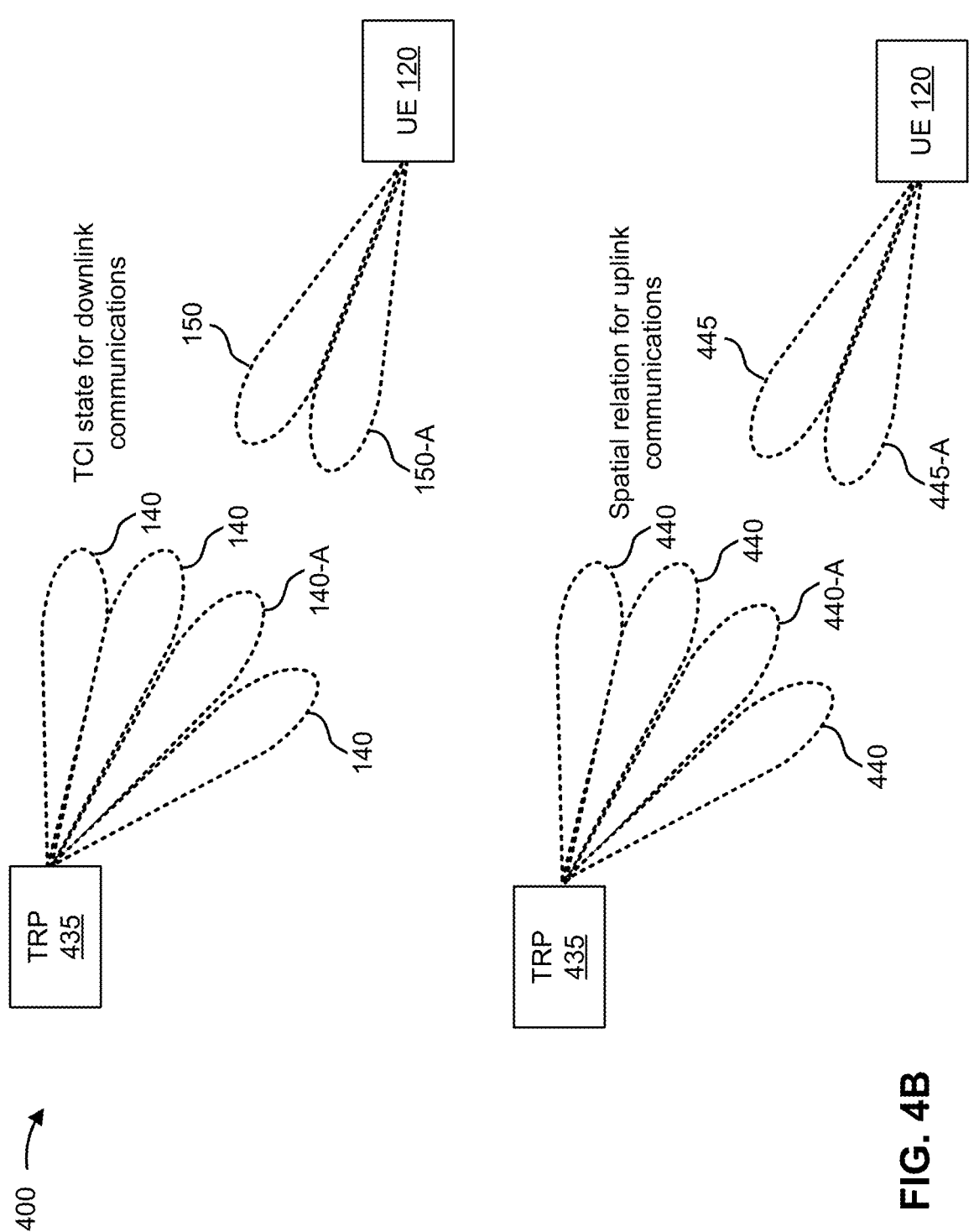

FIGS. 4A and 4B illustrate an example 400 of a logical architecture of a distributed RAN, in accordance with the present disclosure.

A 5G access node 405 may include an access node controller 410. The access node controller 410 may be a CU of the distributed RAN. In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 may include a distributed unit (DU) and/or a radio unit (RU) of the distributed RAN. In some aspects, a TRP 435 may correspond to a network node 110 described above in connection with FIG. 1. For example, different TRPs 435 may be included in different network nodes 110. Additionally, or alternatively, multiple TRPs 435 may be included in a single network node 110. In some aspects, a network node 110 may include a CU (e.g., access node controller 410) and/or one or more DUs (e.g., one or more TRPs 435). In some cases, a TRP 435 may be referred to as a cell, a panel, an antenna array, or an array.

A TRP 435 may be connected to a single access node controller 410 or to multiple access node controllers 410. In some aspects, a dynamic configuration of split logical functions may be present within the architecture of distributed RAN, referred to elsewhere herein as a functional split. For example, a packet data convergence protocol (PDCP) layer, a radio link control (RLC) layer, and/or a medium access control (MAC) layer may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As further shown in FIG. 4A, one or more TRPs 435 may communicate with a UE 120 via one or more NN transmit beams 140. The UE 120 may communicate with one or more TRPs 435 via one or more UE receive beams 150. The one or more NN transmit beams 140 may be wide NN transmit beams, narrow NN transmit beams, or a combination thereof. The one or more UE receive beams 150 may be wide UE receive beams, narrow UE receive beams, or a combination thereof.

In some aspects, a UE 120 may include a communication manager 160. As described in more detail elsewhere herein, the communication manager 160 may receive, via a UE receive beam 150, a first reference signal from a first TRP 435; may receive, via the UE receive beam 150, a second reference signal from a second TRP 435; and may transmit an indication of a difference between a first measurement of the first reference signal and a second measurement of the second reference signal. Additionally, or alternatively, the communication manager 160 may perform one or more other operations described herein.

In some aspects, a TRP 435 may include a communication manager 170. As described in more detail elsewhere herein, the communication manager 170 may transmit a first reference signal for a UE 120; and may receive, from the UE 120, an indication of a difference between a first measurement of the first reference signal and a second measurement of a second reference signal associated with a second TRP 435. Additionally, or alternatively, the communication manager 170 may perform one or more other operations described herein.

As shown in FIG. 4B, a TRP 435 may transmit downlink communications via one or more NN transmit beams 140. The UE 120 may attempt to receive downlink transmissions via one or more UE receive beams 150, which may be configured using different beamforming parameters at receive circuitry of the UE 120. The UE 120 may identify a particular NN transmit beam 140, shown as NN transmit beam 140-A, and a particular UE receive beam 150, shown as UE receive beam 150-A, that provide relatively favorable performance (for example, that have a best channel quality of the different measured combinations of the NN transmit beams 140 and UE receive beams 150). In some examples, the UE 120 may transmit an indication of which NN transmit beam 140 is identified by the UE 120 as a preferred NN transmit beam 140, which the TRP 435 may select for transmissions to the UE 120. The UE 120 may thus attain and maintain a beam pair link (BPL) with the TRP 435 for downlink communications (for example, a combination of the NN transmit beam 140-A and the UE receive beam 150-A), which may be further refined and maintained in accordance with one or more established beam refinement procedures.

A downlink beam, such as an NN transmit beam 140 or a UE receive beam 150, may be associated with a transmission configuration indication (TCI) state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each NN transmit beam 140 may be associated with a synchronization signal block (SSB), and the UE 120 may indicate a preferred NN transmit beam 140 by transmitting uplink transmissions in resources of the SSB that are associated with the preferred NN transmit beam 140. A particular SSB may have an associated TCI state (for example, for an antenna port or for beamforming). The TRP 435 may in some examples, indicate a downlink NN transmit beam 140 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 150 at the UE 120. Thus, the UE 120 may select a corresponding UE receive beam 150 from a set of BPLs based at least in part on the TRP 435 indicating a NN transmit beam 140 via a TCI indication.

The TRP 435 may maintain a set of activated TCI states for downlink shared channel transmissions and a set of activated TCI states for downlink control channel transmissions. The set of activated TCI states for downlink shared channel transmissions may correspond to beams that the TRP 435 uses for downlink transmission on a physical downlink shared channel (PDSCH). The set of activated TCI states for downlink control channel communications may correspond to beams that the TRP 435 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the TRP 435 using a directional UE transmit beam, and the TRP 435 may receive the transmission using a directional NN receive beam. Each UE transmit beam may have an associated beam ID, beam direction, or beam symbols, among other examples. The TRP 435 may transmit downlink communications via one or more NN receive beams 440. The UE 120 may transmit uplink communications via one or more UE transmit beams 445.

The TRP 435 may identify a particular UE transmit beam 445, shown as UE transmit beam 445-A, and a particular NN receive beam 440, shown as NN receive beam 440-A, that provide relatively favorable performance (for example, that have a best channel quality of the different measured combinations of UE transmit beams 445 and NN receive beams 440). In some examples, the TRP 435 may transmit an indication of which UE transmit beam 445 is identified by the TRP 435 as a preferred UE transmit beam, which the TRP 435 may select for transmissions from the UE 120. The UE 120 and the TRP 435 may thus attain and maintain a BPL for uplink communications (for example, a combination of the UE transmit beam 445-A and the NN receive beam 440-A), which may be further refined and maintained in accordance with one or more established beam refinement procedures. An uplink beam, such as a UE transmit beam 445 or an NN receive beam 440, may be associated with a spatial relation. A spatial relation may indicate a directionality or a characteristic of the uplink beam, similar to one or more QCL properties, as described above.

As indicated above, FIGS. 4A and 4B are provided as examples. Other examples may differ from what is described with respect to FIGS. 4A and 4B.

Figure 5A:
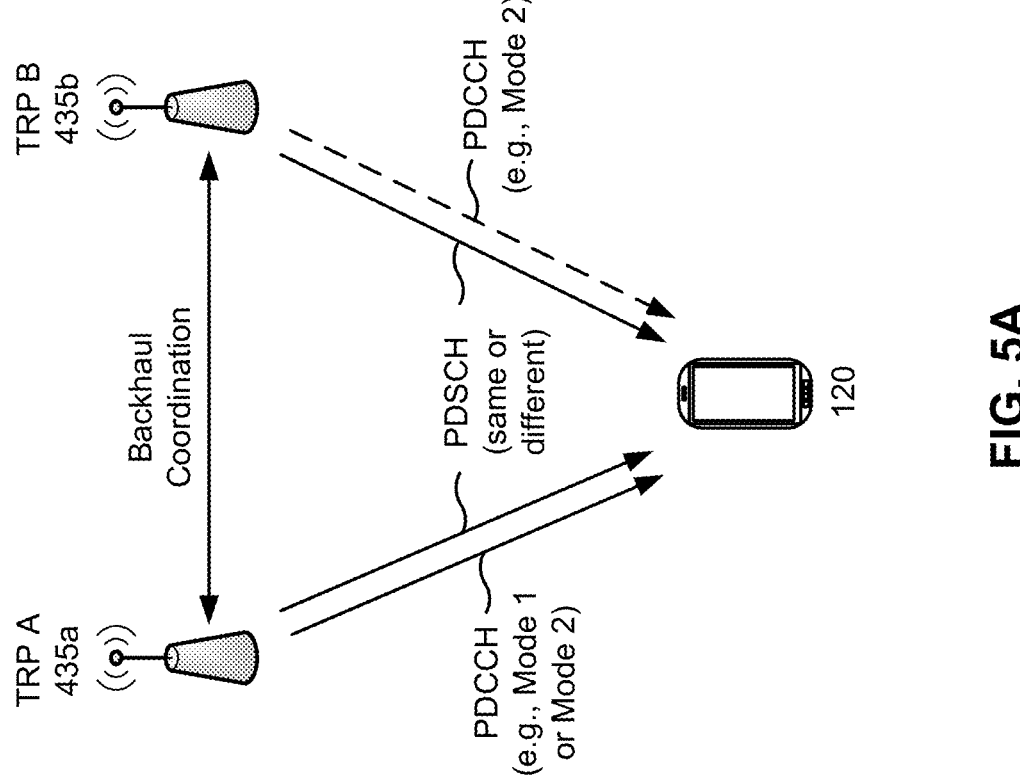
FIG. 5A-5D are diagrams illustrating an example of multiple transmission reception point (multi-TRP) communication, in accordance with the present disclosure.
Figure 5B:
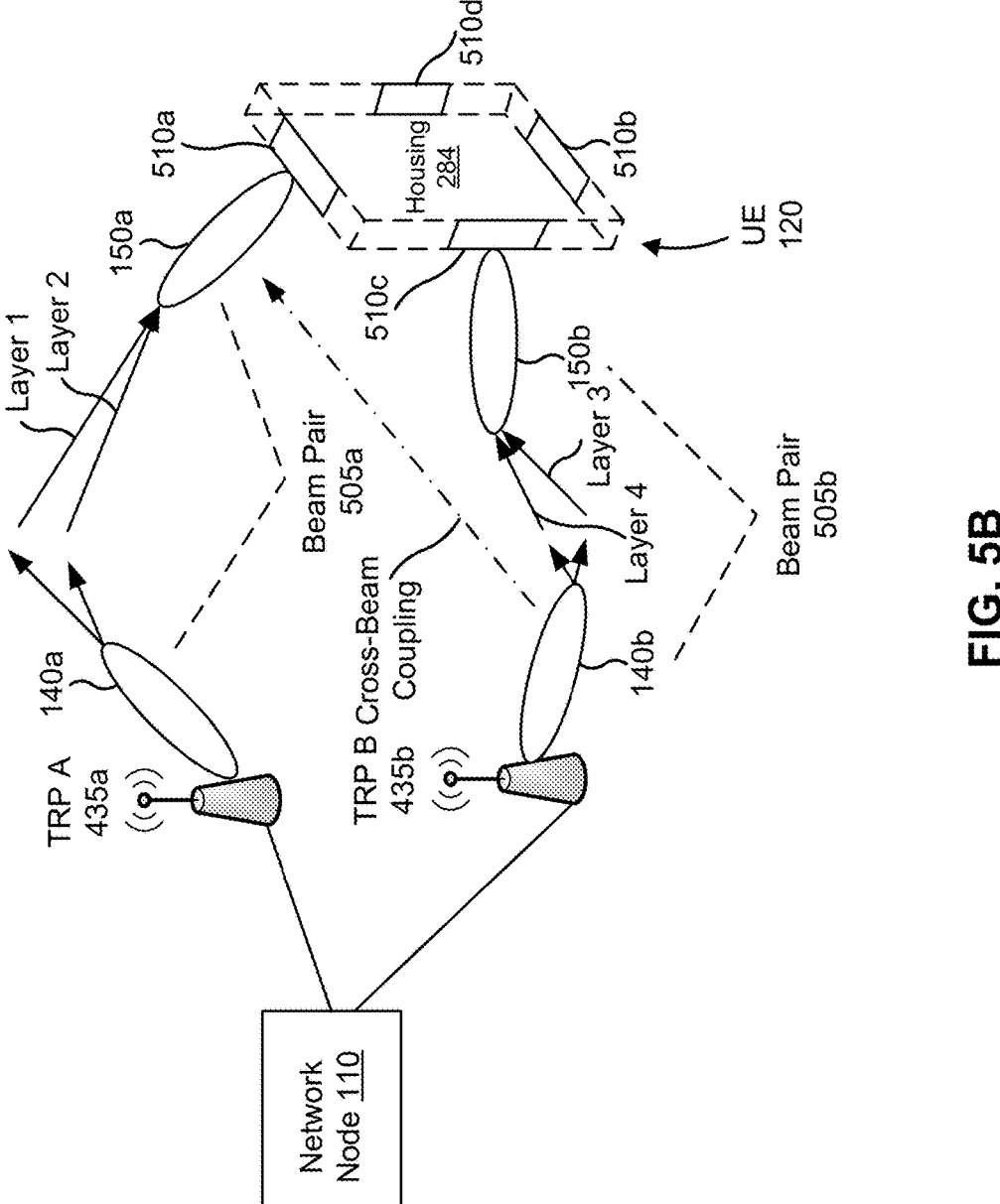

FIGS. 5A-5D are diagrams illustrating an example 500 of multiple TRP (multi-TRP or mTRP) communication (sometimes referred to as multi-panel communication), in accordance with the present disclosure. As shown in FIGS. 5A and 5B, multiple TRPs 435 may communicate with the same UE 120.

As shown in FIG. 5A, the multiple TRPs 435 (shown as TRP A (TRP 435a) and TRP B (TRP 435b)) may communicate with the same UE 120 in a coordinated manner (e.g., using coordinated multipoint transmissions) to improve reliability and/or increase throughput. The TRPs 435 may coordinate such communications via an interface between the TRPs 435 (e.g., a backhaul interface and/or an access node controller 410). The interface may have a smaller delay and/or higher capacity when the TRPs 435 are co-located at the same network node 110 (e.g., when the TRPs 435 are different antenna arrays or panels of the same network node 110), and may have a larger delay and/or lower capacity (as compared to co-location) when the TRPs 435 are located at different network nodes 110. The different TRPs 435 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 435 (e.g., TRP A (TRP 435a) and TRP B (TRP 435b)) may transmit communications to the UE 120 on the same PDSCH. For example, a communication may be transmitted using a single codeword with different spatial layers for different TRPs 435 (e.g., where one codeword maps to a first set of layers transmitted by a first TRP 435 and maps to a second set of layers transmitted by a second TRP 435). As another example, a communication may be transmitted using multiple codewords, where different codewords are transmitted by different TRPs 435 (e.g., using different sets of layers). In either case, different TRPs 435 may use different QCL relationships (e.g., different TCI states) for different DMRS ports corresponding to different layers. For example, a first TRP 435 may use a first QCL relationship or a first TCI state for a first set of DMRS ports corresponding to a first set of layers, and a second TRP 435 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 10 or DCI format 11) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 435, and a second PDCCH may schedule a second codeword to be transmitted by a second TRP 435. Furthermore, first DCI (e.g., transmitted by the first TRP 435) may schedule a first PDSCH communication associated with a first set of DMRS ports with a first QCL relationship (e.g., indicated by a first TCI state) for the first TRP 435, and second DCI (e.g., transmitted by the second TRP 435) may schedule a second PDSCH communication associated with a second set of DMRS ports with a second QCL relationship (e.g., indicated by a second TCI state) for the second TRP 435. In this case, DCI (e.g., having DCI format 10 or DCI format 11) may indicate a corresponding TCI state for a TRP 435 corresponding to the DCI. The TCI field of a DCI indicates the corresponding TCI state (e.g., the TCI field of the first DCI indicates the first TCI state and the TCI field of the second DCI indicates the second TCI state).

As shown in FIG. 5B, the TRP A and the TRP B may be communicatively connected with a network node 110. In some aspects, the TRP A and the TRP B may be communicatively connected with the same network node 110. In some aspects, the TRP A and the TRP B may be communicatively connected with different network nodes 110.

As further shown in FIG. 5B, the TRP A may communicate with the UE 120 via a NN transmit beam 140a of the TRP A and a UE receive beam 150a of the UE 120, and the TRP B may communicate with the UE 120 via a transmit beam 140b of the TRP B and a receive beam 150b of the UE 120. The NN transmit beam 140a and the UE receive beam 150a may be a beam pair 505a associated with the TRP A and the UE 120. The NN transmit beam 140b and the UE receive beam 150b may be a beam pair 505b associated with the TRP B.

The UE 120 may include a plurality of antenna modules 510, such as antenna modules 510a-510d. The antenna modules 510 may be located on one or more sides, one or more ends, and/or another location on the housing 284 of the UE 120. Each antenna module 510 may correspond to an antenna 252, an antenna element, an antenna array, an antenna panel, and/or another type of transceiver hardware. In some aspects, the UE receive beam 150a and the UE receive beam 150b may be associated with different antenna modules 510. For example, and as shown in FIG. 5B, the UE receive beam 150a may be associated with a first antenna module 510a on a first side of the UE 120, and the UE receive beam 150b may be associated with a second antenna module 510c on a second side of the UE 120. In some aspects, the UE receive beam 150a and the UE receive beam 150b may be associated with the same antenna module 510.

In some aspects, the network node 110 may communicate with the UE 120 via multiple-layer PDSCH transmissions (e.g., in FR2 or another frequency range) in the multi-TRP configuration. For example, the network node 110 may communicate with the UE 120 via four layer (4L) PDSCH transmissions or another quantity of layers. Different subsets of the layers may be transmitted from different TRPs. For example, two layers (e.g., Layer 1 and Layer 2) may be transmitted from the TRP A via the NN transmit beam 140a of the beam pair 505a, and two other layers (e.g., Layer 3 and Layer 4) may be transmitted from the TRP B via the NN transmit beam 140b of the beam pair 505b. The UE 120 may receive the two layers from the TRP A via the UE receive beam 150a of the beam pair 505a, and may receive the two other layers from the TRP B via the UE receive beam 150b of the beam pair 505b.

As further shown in FIG. 5B, cross-beam coupling may occur across the beam pairs 505a and 505b. Cross-beam coupling may refer to the reception of a signal transmitted via a transmit beam and received via a receive beam that is configured to receive a different transmit beam. An example of cross-beam coupling may include a signal transmitted by the TRP B 435b via the transmit beam 140b of the beam pair 505b being received on the receive beam 150a of the UE 120 of the beam pair 505a. The reception of the signal is undesirable in that the signal is intended for reception on the receive beam 150b of the UE 120 of the beam pair 505b and not on the receive beam 150a of the UE 120 of the beam pair 505a (the receive beam 150a being refined for reception of signals transmitted by the TRP A 435a on the transmit beam 140a of the beam pair 505a.

Figures 5C, 5D:
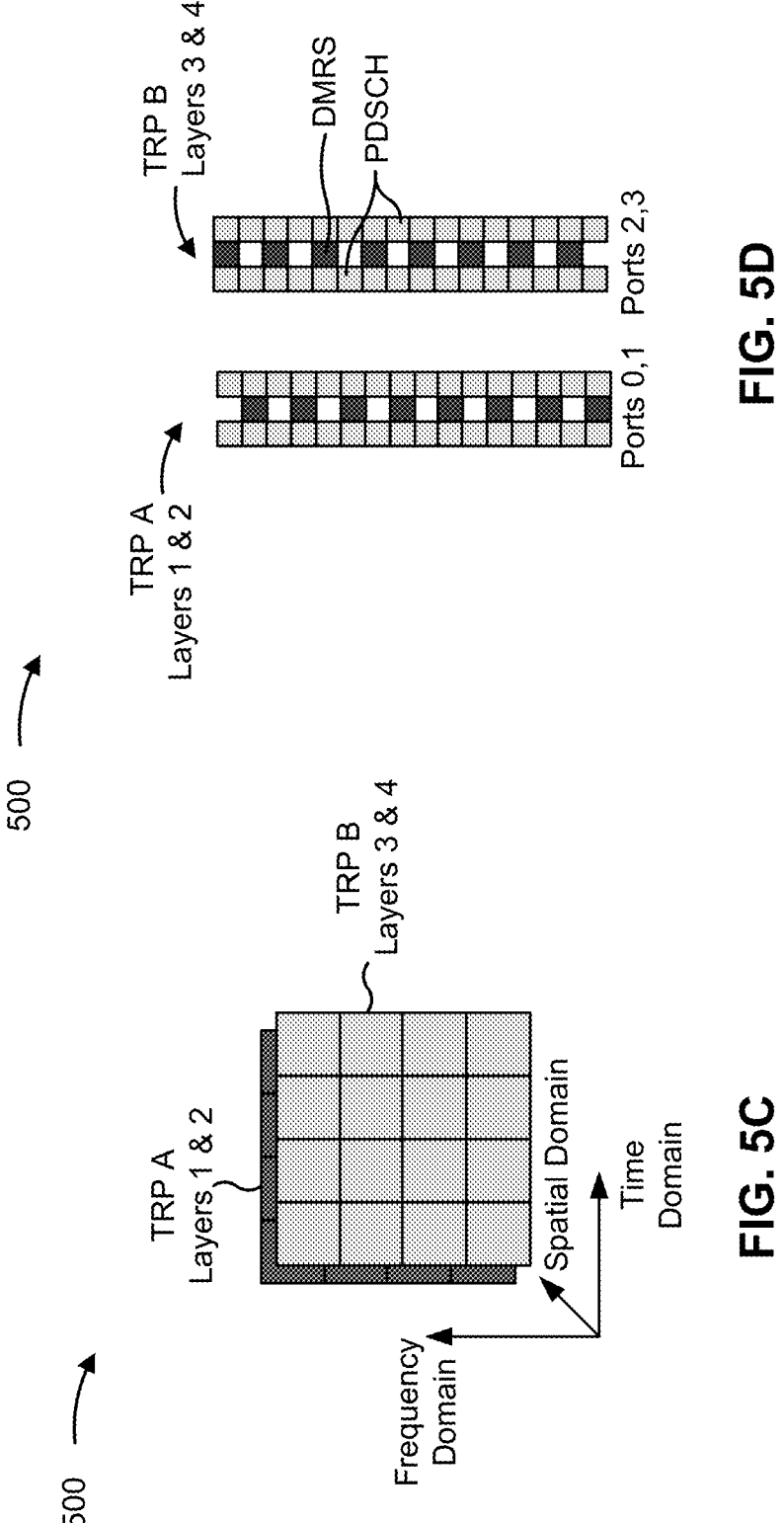

A shown in FIGS. 5C and 5D, in a single DCI configuration, PDSCH transmissions from the TRP A and the TRP B may share the same time domain resources and/or the same frequency domain resources, and may be spatially multiplexed using spatial division multiplexing (SDM). A single DCI transmission schedules one PDSCH with up to rank 4 (e.g., because there are 4 total layers that can be scheduled by the single DCI transmission). As shown in FIG. 5C, two layers (e.g., Layers 1 and 2) are transmitted from the TRP A, and two other layers (e.g., Layers 3 and 4) are transmitted from the TRP B. The Layers 1 and 2 may be spatial division multiplexed with the Layers 3 and 4. Layers 1 and 2 and Layers 3 and 4 may share the same (or a subset of the same) time domain resources (e.g., slots, symbols) and/or may share the same (or a subset of the same) frequency domain resources (e.g., resource blocks, resource elements, subcarriers). As shown in FIG. 5D, the TRP A may transmit the two layers (e.g., Layers 1 and 2) on ports 0 and 1, and the TRP B may transmit the two other layers (e.g., Layers 3 and 4) on ports 2 and 3. DMRSs may be transmitted from the TRP A and the TRP B via different code division multiplexing (CDM) groups.

In a multiple-DCI configuration, separate PDCCHs from each of the TRP A and the TRP B schedule separate PDSCHs with up to rank 2 (e.g., because each PDCCH can schedule up to two layers). The PDSCHs scheduled by the PDCCHs may overlap in the time domain and/or in the frequency domain. However, the PDSCHs scheduled by the PDCCHs may be scheduled with different MCSs.

As indicated above, FIGS. 5A-5D are provided as an example. Other examples may differ from what is described with respect to FIGS. 5A-5D.

Figures 6A, 6B, 6C:
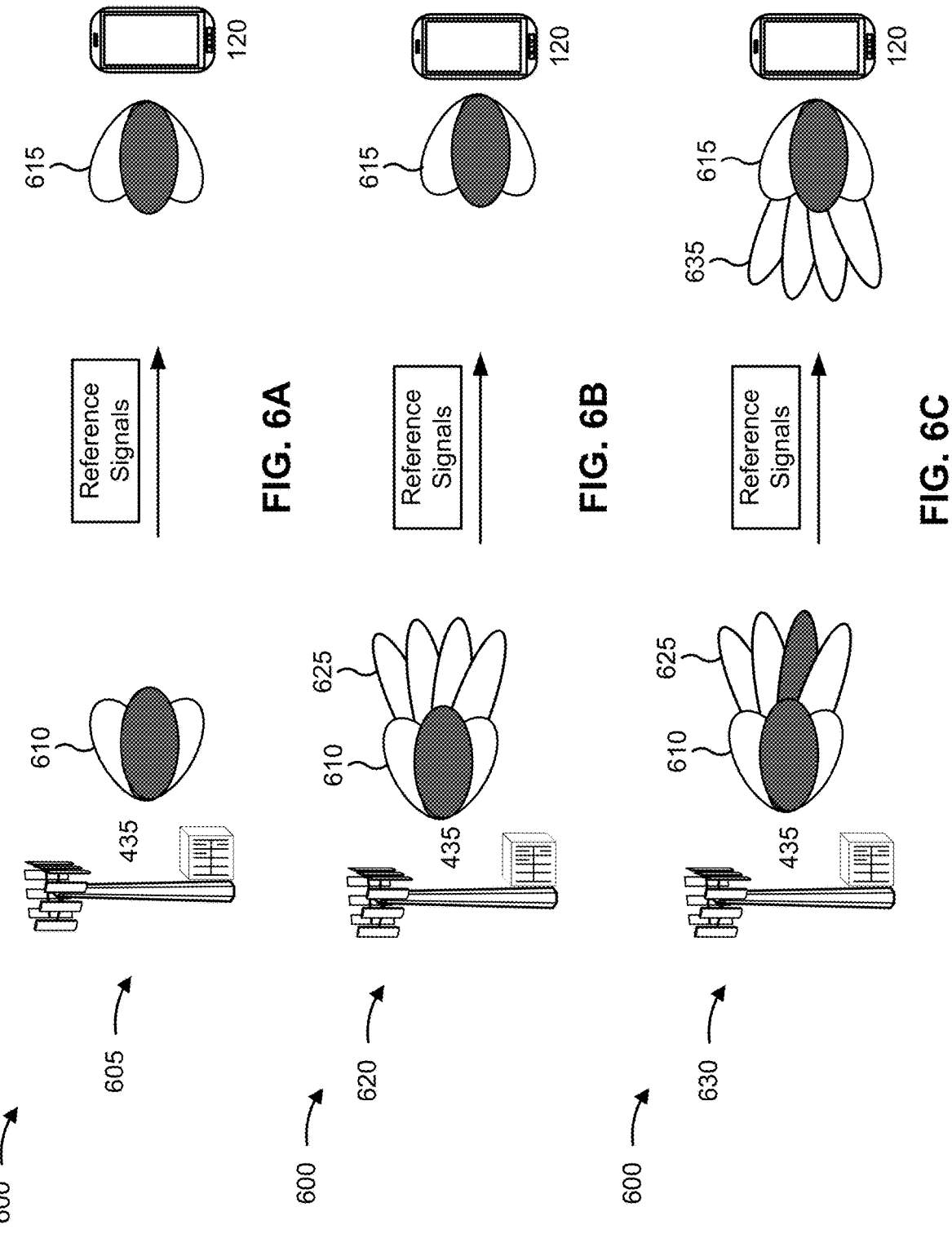
FIGS. 6A-6C are diagrams illustrating an example of a beam management procedure, in accordance with the present disclosure.

FIGS. 6A-6C are diagrams illustrating an example 600 of a beam management procedure, in accordance with the present disclosure. As shown in FIGS. 6A-6C, the example 600 includes a UE 120 in communication with a TRP 435 in a wireless network (e.g., wireless network 100). However, the devices shown in FIGS. 6A-6C are provided as examples, and the wireless network may support communication and beam management between other devices. For example, the beam management procedure techniques described as being performed by a TRP 435 may be performed by a network node 110, an RU 340, and/or another wireless communication device. In some aspects, the UE 120 and the network node 110 may be in a connected state (e.g., an RRC connected state).

As shown in FIGS. 6A-6C, example 600 may include a first beam management operation 605 (e.g., a P1 beam management procedure). The first beam management operation 605 may be referred to as a beam selection procedure, an initial beam acquisition procedure, a beam sweeping procedure, a cell search procedure, and/or a beam search procedure. In the first beam management operation 605, reference signals (e.g., synchronization signal blocks (SSBs), channel state information reference signals (CSI-RSs), DMRSs, and/or one or more other reference signals) may be transmitted from the TRP 435 to the UE 120. The reference signals may be configured to be periodic (e.g., using RRC signaling), semi-persistent (e.g., using media access control (MAC) control element (MAC-CE) signaling), and/or aperiodic (e.g., using DCI).

The first beam management operation 605 may include the TRP 435 performing beam sweeping over multiple NN transmit (Tx) beams 140. The NN transmit beams 140 may be wide NN transmit beams 610 (e.g., wireless communication beams that have not been refined and/or that is associated with a small beamforming gain). The TRP 435 may transmit a reference signal using each wide NN transmit beam 610 for beam management. To enable the UE 120 to perform receive (Rx) beam sweeping, the TRP 435 may use a wide NN transmit beam 610 to transmit (e.g., with repetitions) each reference signal at multiple times within the same reference signal resource set so that the UE 120 can sweep through UE receive beams 150 (e.g., wide UE receive beams 615) in multiple transmission instances. For example, if the TRP 435 has a set of N wide NN transmit beams 610 and the UE 120 has a set of M wide UE receive beams 615, the reference signal may be transmitted on each of the N wide NN transmit beams 610 M times so that the UE 120 may receive M instances of the reference signal per wide UE receive beam 615. In other words, for each wide NN transmit beam 610 of the TRP 435, the UE 120 may perform beam sweeping through the wide UE receive beams 615 of the UE 120. As a result, the first beam management operation 605 (e.g., the P1 procedure) may enable the UE 120 to measure a reference on different wide NN transmit beams 610 using different wide UE receive beams 615 to support selection of a beam pair 505 that includes a wide NN transmit beam 610 and a wide UE receive beam 615. The UE 120 may report measurement results of the reference signals to the TRP 435 to enable the TRP 435 to select one or more beam pair(s) 505 for communication between the TRP 435 and the UE 120. The measurements may be performed by the UE 120 and may include RSRP measurements, RSSI measurements, CQI measurements, RSRQ measurements, and/or signal measurements of another type.

As further shown in FIGS. 6A-6C, the example 600 may include a second beam management operation 620 (e.g., a P2 beam management procedure). The second beam management operation 620 may be referred to as a beam refinement procedure, a network node beam refinement procedure, a TRP beam refinement procedure, and/or a transmit beam refinement procedure. In the second beam management operation 620, reference signals (e.g., SSBs, CSI-RSs, DMRSs, and/or reference signals of another type) may be transmitted from the TRP 435 to the UE 120. The reference signals may be configured to be aperiodic (e.g., using DCI). The second beam management operation 620 may include the TRP 435 performing beam sweeping over one or more NN transmit beams 140. The NN transmit beams 140 may be narrow NN transmit beams 625. A narrow NN transmit beam refers to a wireless communication beam that is highly directional and has a high beamforming gain. The one or more narrow NN transmit beams 625 may be a subset of all of the narrow NN transmit beams associated with the TRP 435 (e.g., determined based at least in part on measurements reported by the UE 120 in connection with the first beam management operation 605). The TRP 435 may transmit a reference signal using each narrow NN transmit beam 625 of the one or more narrow NN transmit beams 625 for beam management. The UE 120 may measure each reference signal using a single (e.g., a same) wide UE receive beam 615 (e.g., determined based at least in part on measurements performed in connection with the first beam management operation 605). The second beam management operation 620 may enable the network node 110 to select a best or preferred narrow NN transmit beam 625 based at least in part on measurements of the reference signals (e.g., measured by the UE 120 using the single wide UE receive beam 615) reported by the UE 120. The measurements may include RSRP measurements, RSSI measurements, CQI measurements, RSRQ measurements, and/or signal measurements of another type.

As further shown in FIGS. 6A-6C, the example 600 may include a third beam management operation 630 (e.g., a P3 beam management procedure). The third beam management operation 630 may be referred to as a beam refinement procedure, a UE beam refinement procedure, and/or a receive beam refinement procedure. In the third beam management operation 630, one or more reference signals (e.g., SSBs, CSI-RSs, DMRSs, and/or reference signals of another type) may be transmitted from the TRP 435 to the UE 120. The reference signals may be configured to be aperiodic (e.g., using DCI). The third beam management operation 630 may include the TRP 435 transmitting the one or more reference signals using a single narrow NN transmit beam 625 (e.g., determined based at least in part on measurements reported by the UE 120 in connection with the first beam management operation 605 and/or the second beam management operation 620). To enable the UE 120 to perform receive beam sweeping of narrow UE receive beams 635, the TRP 435 may use the narrow NN transmit beam 625 to transmit (e.g., with repetitions) a reference signal at multiple times within the same reference signal resource set so that UE 120 can sweep through one or more narrow UE receive beams 635 in multiple transmission instances. The one or more narrow UE receive beams 635 may be a subset of all UE receive beams 150 associated with the UE 120 (e.g., determined based at least in part on measurements performed in connection with the first beam management operation 605 and/or the second beam management operation 620). The third beam management operation 630 may enable the TRP 435 and/or the UE 120 to select a best or preferred narrow UE receive beam 635 based at least in part on reported measurements received from the UE 120 (e.g., of the CSI-RS of the transmit beam using the one or more receive beams). The measurements may include RSRP measurements, RSSI measurements, CQI measurements, RSRQ measurements, and/or signal measurements of another type.

In some aspects, the UE 120 is communicatively connected with a plurality of TRPs 435 in a multi-TRP configuration. In these aspects, the beam management procedure operations described in connection with FIGS. 6A-6C may be performed by a plurality of TRPs (e.g., a TRP A and a TRP B) to select beam pairs 505 and refine beams (e.g., NN transmit beams 140, UE receive beams 150) for the TRPs and the UE 120. The cross-beam coupling reporting techniques described herein, such as in connection with FIGS. 7A-7D, may be performed in connection with the beam management procedures performed by the UE 120 and the TRPs. For example, cross-beam coupling reporting techniques described herein, such as in connection with FIGS. 7A-7D, may be performed in connection with first beam management operation 605 (e.g., the P1 procedure) and/or in connection with the second beam management operation 620 (e.g., the P2 procedure), among other examples.

The cross-beam coupling reporting described herein enables the TRPs to perform respective beam management procedures in a coordinated manner in which the cross-beam coupling associated with the NN transmit beams 140 of the TRP A and the NN transmit beams 140 of the TRP B are considered when the TRP A and the TRP B select narrow NN transmit beams 625 for communication with the UE 120. In this way, the cross-beam coupling reporting described herein may increase throughput between the TRP A and the UE 120, and may increase throughput between the TRP B and the UE. The cross-beam coupling reporting described herein may decrease latency between the TRP A and the UE 120, and between the TRP B and the UE 120. The cross-beam coupling reporting described herein may increase signal quality between the TRP A and the UE 120, and between the TRP B and the UE 120. The cross-beam coupling reporting described herein may decrease the quantity of dropped or unreceived transmissions between the TRP A and the UE 120, and between the TRP B and the UE 120. The cross-beam coupling reporting described herein may decrease the rate of retransmissions between the TRP A and the UE 120

(which decreases the consumption of processing, memory, battery, and/or network resources by the TRP A and the UE 120), and between the TRP B and the UE 120 (which decreases the consumption of processing, memory, battery, and/or network resources by the TRP B and the UE 120).

As indicated above, FIGS. 6A-6C are provided as an example of beam management procedures. Other examples of beam management procedures may differ from what is described with respect to FIGS. 6A-6C. For example, the UE 120 and the network node 110 may perform the third beam management procedure before performing the second beam management procedure, and/or the UE 120 and the network node 110 may perform a similar beam management procedure to select a UE transmit beam.

Figure 7A:
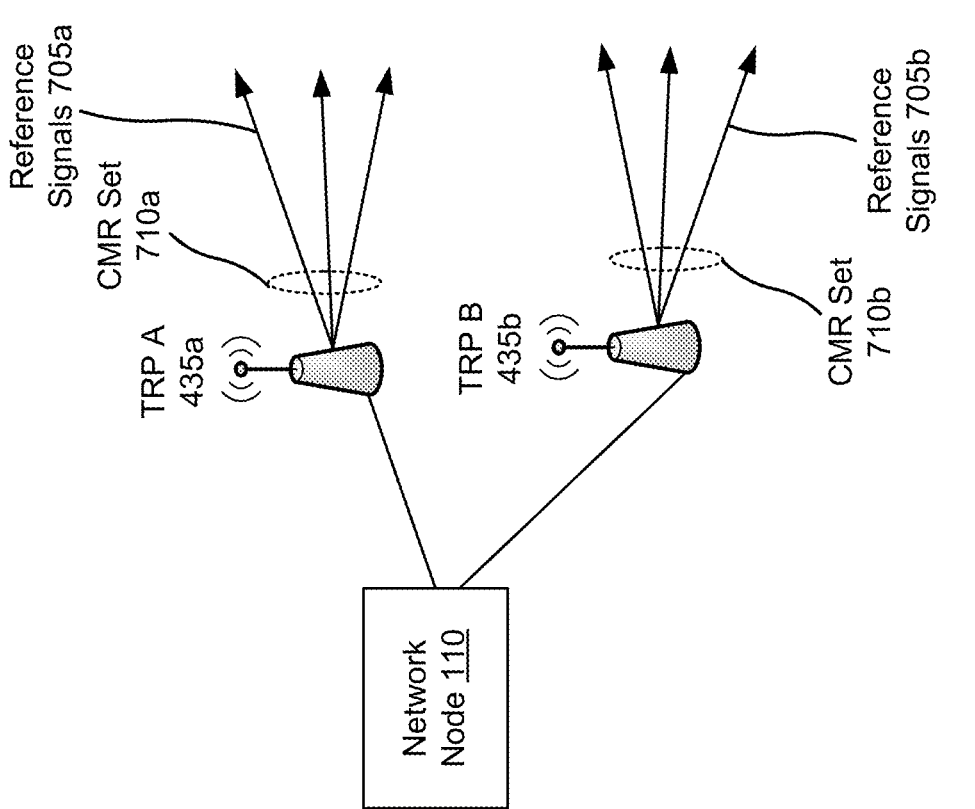
FIGS. 7A-7D are diagrams of examples of cross-beam coupling reporting, in accordance with the present disclosure.

FIGS. 7A-7D are diagrams of examples 700 of cross-beam coupling reporting, in accordance with the present disclosure. As shown in FIG. 7A, the examples 700 may include communication between a UE 120 and a plurality of TRPs 435, such as TRP A (TRP 435a) and TRP B (TRP 435b). The UE 120, the TRP A, and the TRP B may be configured in a multi-TRP communication configuration, such as in a Mode 1 multi-TRP communication configuration or a Mode 2 multi-TRP communication configuration, among other examples. In some aspects, the TRP A and/or the TRP B may be communicatively coupled with a network node 110. In some aspects, TRP A and/or the TRP B may be communicatively coupled with the same network node 110.

In some aspects, TRP A and/or the TRP B may be communicatively coupled with different network nodes 110. In some aspects, the TRP A and/or the TRP B may each be an RU 340 in a disaggregated base station architecture 300. In some aspects, the network node 110 may be an access node controller 410, and the TRP A, the TRP B, and the access node controller 410 may be a 5G access node 405. In some aspects, the network node 110 may be a DU 330 and/or a CU 310 in a disaggregated base station architecture 300.

As shown in FIG. 7A, the TRP A may transmit a plurality of reference signals 705a, and the TRP B may transmit a plurality of reference signals 705b. The reference signals 705a and the reference signals 705b may each include SSBs, CSI-RSs, DMRSs, and/or another type of reference signals. The reference signals 705a may be included in a channel measurement resource (CMR) set 710a, which may include 0 to any particular quantity of channel measurement resources. The channel measurement resources in the CMR set 710a may include time domain resources (e.g., slots, symbols) and/or frequency domain resources (e.g., resource blocks, resource elements, subcarriers) in which the reference signals 705a may be transmitted. The reference signals 705b may be included in a CMR set 710b, which may include 0 to any particular quantity of channel measurement resources. The channel measurement resources in the CMR set 710b may include time domain resources (e.g., slots, symbols) and/or frequency domain resources (e.g., resource blocks, resource elements, subcarriers) in which the reference signals 705b may be transmitted.

The TRP A may transmit the reference signals 705a on a plurality of NN transmit beams 140. The NN transmit beams 140 may include wide NN transmit beams 610 and/or narrow NN transmit beams 625. The TRP B may transmit the reference signals 705b on a plurality of NN transmit beams 140. The NN transmit beams 140 may include wide NN transmit beams 610 and/or narrow NN transmit beams 625. In some aspects, the TRP A may transmit the reference signals 705a and the TRP B may transmit the reference signals 705b as part of a beam management procedure. For example, the TRP A may transmit the reference signals 705a and the TRP B may transmit the reference signals 705*b* as part of a first beam management operation 605 (e.g., a P1 procedure) of a beam management procedure. As another example, the TRP A may transmit the reference signals 705*a* and the TRP B may transmit the reference signals 705*b* as part of a second beam management operation 620 (e.g., a P2 procedure) of a beam management procedure.

Figure 7B:
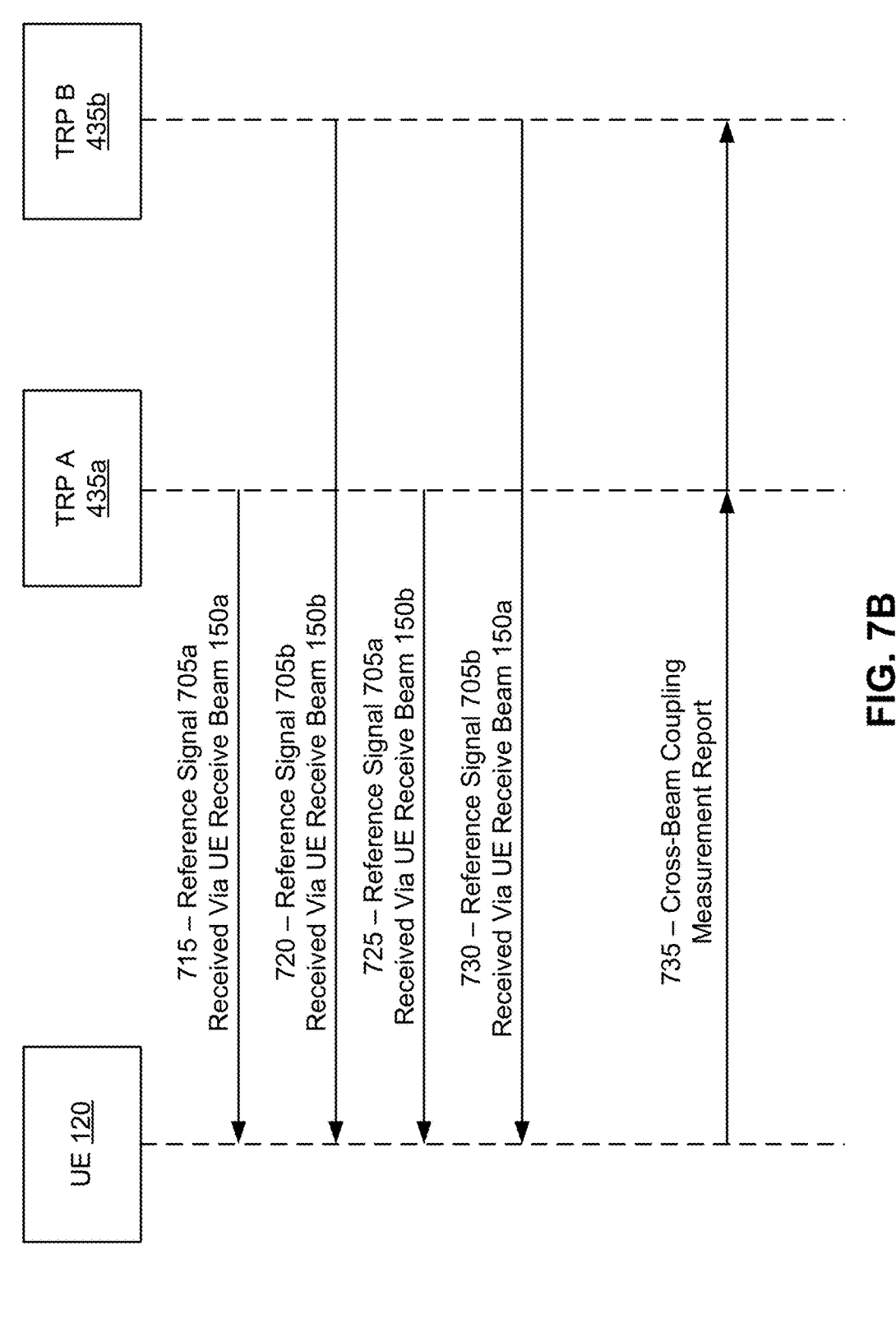

As shown in FIG. 7B, at 715, the TRP A may transmit a reference signal 705*a*. The TRP A may transmit the reference signal 705*a* via a NN transmit beam 140*a* (e.g., a first wide NN transmit beam 610, a first narrow NN transmit beam 625). The UE 120 may receive the reference signal 705*a* via a UE receive beam 150*a* (e.g., a first wide UE receive beam 615, a first narrow beam 635 that is refined to receive the reference signal 705*a* via the NN transmit beam 140*a*). The UE receive beam 150*a* may be associated with a first antenna module 510 of the UE 120. The first narrow beam 635 being "refined" to receive the reference signal 705*a* via the NN transmit beam 140*a* may refer to the first narrow beam 635 being selected and/or configured to optimize reception of the reference signal 705*a* via the NN transmit beam 140*a*.

As further shown in FIG. 7B, at 720, the TRP B may transmit a reference signal 705*b*. The TRP B may transmit the reference signal 705*b* via a NN transmit beam 140*b* (e.g., a second wide NN transmit beam 610, a second narrow NN transmit beam 625). The UE 120 may receive the reference signal 705*b* via a UE receive beam 150*b* (e.g., a second wide UE receive beam 615, a second narrow UE receive beam 635 that is refined to receive the reference signal 705*b* via the NN transmit beam 140*b*). The UE receive beam 150*b* may be associated with a second antenna module 510 of the UE 120. In some aspects, the first antenna module 510 and the second antenna module 510 are the same antenna module 510 of the UE 120. In some aspects, the first antenna module 510 and the second antenna module 510 are different antenna modules 510 of the UE 120 that are located on different sides of the housing 284 of the UE 120. The second narrow beam 635 being "refined" to receive the reference signal 705*b* via the NN transmit beam 140*b* may refer to the second narrow beam 635 being selected and/or configured to optimize reception of the reference signal 705*b* via the NN transmit beam 140*b*.

As further shown in FIG. 7B, at 725, the TRP A may transmit the reference signal 705*a*. The TRP A may transmit the reference signal 705*a* via the NN transmit beam 140*a* (e.g., the first wide NN transmit beam 610, the first narrow NN transmit beam 625). The UE 120 may receive the reference signal 705*a* via the UE receive beam 150*b* (e.g., the second wide UE receive beam 615, the second narrow UE receive beam 635 that is refined to receive the reference signal 705*b* via the NN transmit beam 140*b*). The UE 120 may receive the reference signal 705*a* via the UE receive beam 150*a* and via the UE receive beam 150*b* so that the UE 120 can perform measurements of the reference signal 705*a* via the UE receive beam 150*a* and via the UE receive beam 150*b*. This enables the UE 120 to determine the amount of cross-beam coupling of the reference signal 705*a* from the NN transmit beam 140*a* on the UE receive beam 150*b* that is refined to receive the reference signal 705*b*.

As further shown in FIG. 7B, at 730, the TRP B may transmit the reference signal 705*b*. The TRP B may transmit the reference signal 705*b* via the NN transmit beam 140*b* (e.g., the second wide NN transmit beam 610, the second narrow NN transmit beam 625). The UE 120 may receive the reference signal 705*b* via the UE receive beam 150*a* (e.g., the first wide UE receive beam 615, the first narrow UE receive beam 635 that is refined to receive the reference signal 705*a* via the NN transmit beam 140*a*). The UE 120 may receive the reference signal 705*b* via the UE receive beam 150*a* and via the UE receive beam 150*b* so that the UE 120 can perform measurements of the reference signal 705*b* via the UE receive beam 150*a* and via the UE receive beam 150*b*. This enables the UE 120 to determine the amount of cross-beam coupling of the reference signal 705*b* from the NN transmit beam 140*b* on the UE receive beam 150*a* that is refined to receive the reference signal 705*a*.

In some aspects, the UE 120 selects or identifies the reference signal 705*a* and the reference signal 705*b* that are to be measured based at least in part on a UE implementation of the UE 120. The UE implementation of the UE 120 may be based on optimization parameters configured for the UE 120, such as prioritizing throughput, latency, reliability, coverage, signal strength, and/or another optimization parameter.

As further shown in FIG. 7B, at 735, the UE 120 transmits a cross-beam coupling measurement report. The UE 120 may transmit the cross-beam coupling measurement report to the TRP A and/or to the TRP B. In some aspects, the cross-beam coupling measurement report is a standalone measurement report that is transmitted by the UE 120. In some aspects, the cross-beam coupling measurement report is a subset of another measurement report that is transmitted by the UE 120. For example, the cross-beam coupling measurement report may be a part of measurement report that is associated with a first beam management operation 605 (e.g., a P1 procedure). For example, the cross-beam coupling measurement report may be a part of measurement report that is associated with a second beam management operation 620 (e.g., a P2 procedure).

In some aspects, the cross-beam measurement report may include an indication of a first signal measurement associated with the reference signal 705*a* transmitted via the NN transmit beam 140*a* and received via the UE receive beam 150*a*. The first signal measurement may include an RSRP measurement, an RSSI measurement, an RSRQ measurement, a CQI measurement, and/or another type of signal measurement. In some aspects, the UE 120 may report the actual value that was measured for the first signal measurement. In some aspects, the UE 120 may quantize the first signal measurement to a closed configured reporting value based at least in part on a configured dynamic range and/or quantization step for reporting the first signal measurement. For example, quantization reporting values of 3 decibels (dB), 6 dB, 9 dB, 12 dB, 15 dB, 18 dB, 21 dB, and >21 dB may be configured, and the UE 120 may select the reporting value that is closest to the result of the first signal measurement and the reporting value that is reported as the first signal measurement. In some aspects, a measurement error for the first signal measurement is less than a threshold margin.

In some aspects, the cross-beam measurement report may include an indication of a second signal measurement associated with the reference signal 705*b* transmitted via the NN transmit beam 140*b* and received via the UE receive beam 150*b*. The second signal measurement may include an RSRP measurement, an RSSI measurement, an RSRQ measurement, a CQI measurement, and/or another type of signal measurement. In some aspects, the UE 120 may report the actual value that was measured for the second signal measurement. In some aspects, the UE 120 may quantize the second signal measurement based at least in part on a configured dynamic range and/or quantization step for reporting the second signal measurement. In some aspects, a measurement error for the second signal measurement is less than a threshold margin.

In some aspects, the cross-beam measurement report may include an indication of a third signal measurement associated with the reference signal 705a transmitted via the NN transmit beam 140a and received via the UE receive beam 150b. The third signal measurement may include an RSRP measurement, an RSSI measurement, an RSRQ measurement, a CQI measurement, and/or another type of signal measurement. In some aspects, the UE 120 may report the actual value that was measured for the third signal measurement. In some aspects, the UE 120 may quantize the third signal measurement based at least in part on a configured dynamic range and/or quantization step for reporting the third signal measurement.

In some aspects, the cross-beam measurement report may include an indication of a fourth signal measurement associated with the reference signal 705b transmitted via the NN transmit beam 140b and received via the UE receive beam 150a. The fourth signal measurement may include an RSRP measurement, an RSSI measurement, an RSRQ measurement, a CQI measurement, and/or another type of signal measurement. In some aspects, the UE 120 may report the actual value that was measured for the fourth signal measurement. In some aspects, the UE 120 may quantize the fourth signal measurement based at least in part on a configured dynamic range and/or quantization step for reporting the fourth signal measurement.

Figure 7C:
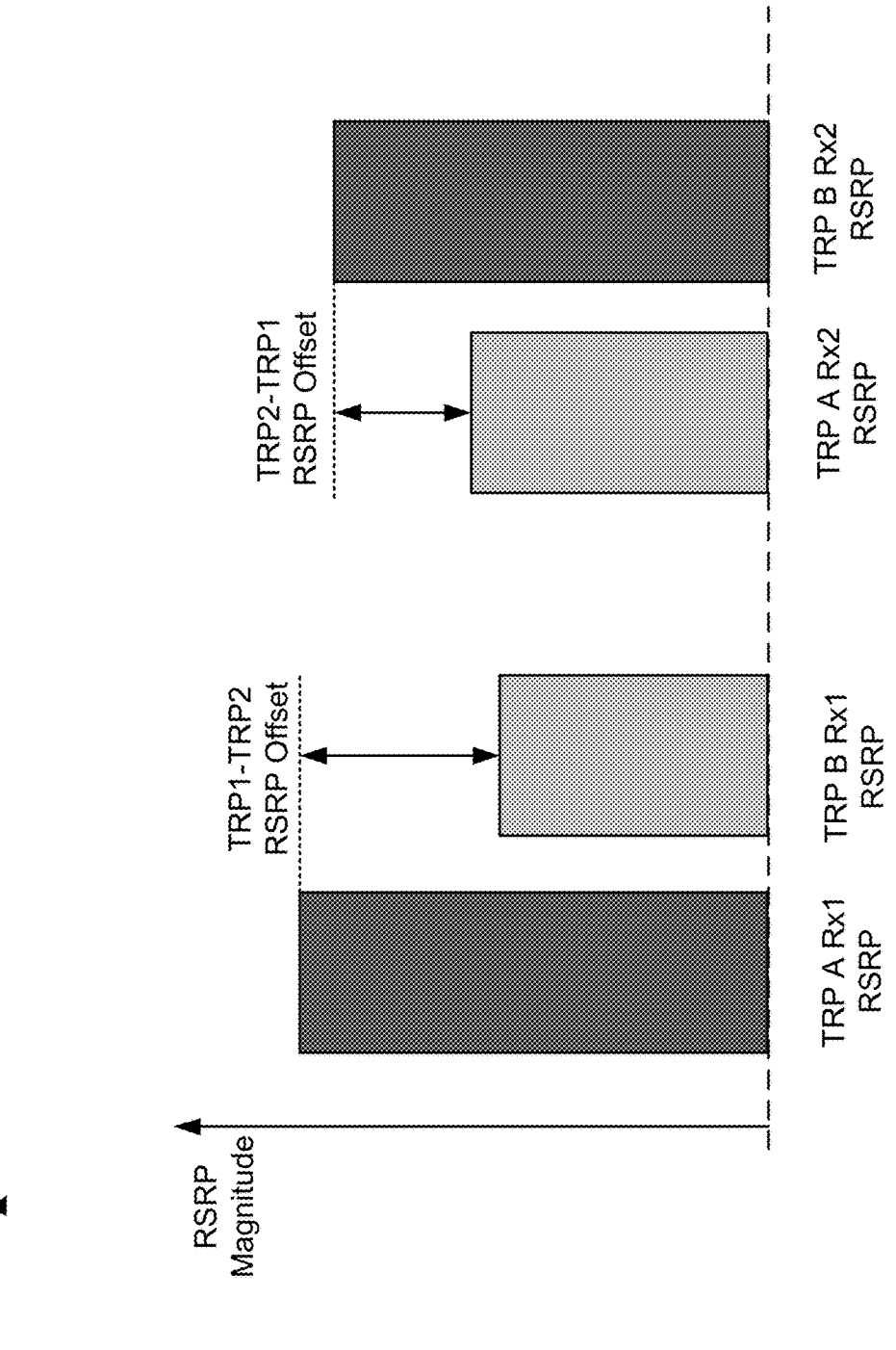

Turning to FIG. 7C, in some aspects, the cross-beam measurement report may include an indication of a first difference between the first signal measurement of the reference signal 705a received via the UE receive beam 150a, and the fourth signal measurement of the reference signal 705b received via the UE receive beam 150a. The indication of the first difference may be an indication of the cross-beam coupling between the NN transmit beam 140b via which the reference signal 705b was transmitted, and the UE receive beam 150a. The first difference may be an RSRP offset between an RSRP of reception (Rx1) from the TRP A via the UE receive beam 150a and an RSRP of reception (Rx1) from the TRP B via the UE receive beam 150150a.

In some aspects, the UE 120 may report the actual value for the first difference. In some aspects, the UE 120 may quantize the first difference based at least in part on a configured dynamic range and/or quantization step for cross-beam coupling reporting. In some aspects, the value for cross-beam reporting is determined by the UE 120 based at least in part on the UE implementation of the UE 120. The UE implementation of the UE 120 may be based on receive beam 150a design. In some aspects, the value for cross-beam reporting is determined by the UE 120 based at least in part on the reference signals that were selected for cross-beam coupling reporting.

In some aspects, the cross-beam measurement report may include an indication of a second difference between the second signal measurement of the reference signal 705b received via the UE receive beam 150b, and the third signal measurement of the reference signal 705a received via the UE receive beam 150b. The indication of the second difference may be an indication of the cross-beam coupling between the NN transmit beam 140a via which the reference signal 705a was transmitted, and the UE receive beam 150b. The second difference may be an RSRP offset between an RSRP of reception (Rx2) from the TRP B via the UE receive beam 150b and an RSRP of reception (Rx2) from the TRP A via the UE receive beam 150b.

In some aspects, the UE 120 may report the actual value for the second difference. In some aspects, the UE 120 may quantize the second difference based at least in part on a configured dynamic range and/or quantization step for cross-beam coupling reporting. In some aspects, the value for cross-beam reporting is determined by the UE 120 based at least in part on the UE implementation of the UE 120. The UE implementation of the UE 120 may be based on receive beam 150a design. In some aspects, the value for cross-beam reporting is determined by the UE 120 based at least in part on the reference signals that were selected for cross-beam coupling reporting.

Figure 7D:
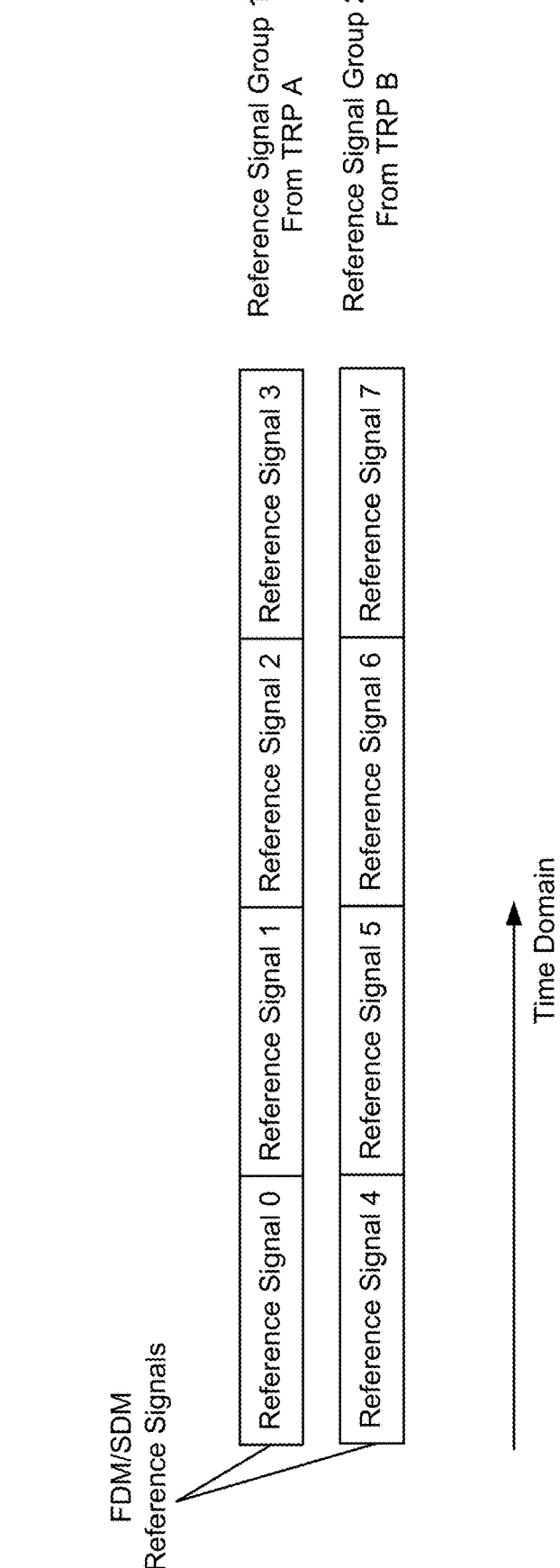

Turning to FIG. 7D, as indicated above, a second beam management operation 620 (e.g., a P2 procedure) may include reference signal transmissions that a TRP 435 sweeps across narrow NN transmit beams 625 via consecutive reference signal resources. For multi-TRP, the second beam management operation 620 (e.g., the P2 procedure) may include simultaneous reference signal transmissions from the TRP A and the TRP B. The UE 120 may measure the reference signals from each of the TRP A and the TRP B using UE receive beams 150 that were refined toward each of the TRP A and the TRP B in a first beam management operation 605 (e.g., a P1 procedure). The UE 120 may transmit the cross-beam coupling measurement report (including one or more of the first signal measurement, the second signal measurement, the third signal measurement, the fourth signal measurement, the first difference, and/or the second difference described above) to the TRP A and the TRP B for the selected reference signal pair.

A network node 110 associated with the TRP A and/or associated with the TRP B may configure a quantity of reference signal pairs (where each pair includes a reference signal 705a from the TRP A and a reference signal 705b from the TRP B) for which the UE 120 is to provide a cross-beam coupling measurement report in the second beam management operation 620 (e.g., the P2 procedure).

As further shown in FIG. 7D, the reference signals 705a (e.g., reference signal 0 through reference signal 3 from reference signal group 1) and the reference signals 705b (e.g., the reference signal 4 through the reference signal 7 from reference signal group 2) may be simultaneously transmitted. The reference signals 705a and the reference signals 705b may be frequency division multiplexed and/or spatially division multiplexed.

As indicated above, FIGS. 7A-7D are provided as examples. Other examples may differ from what is described with respect to FIGS. 7A-7D.

Figure 8:
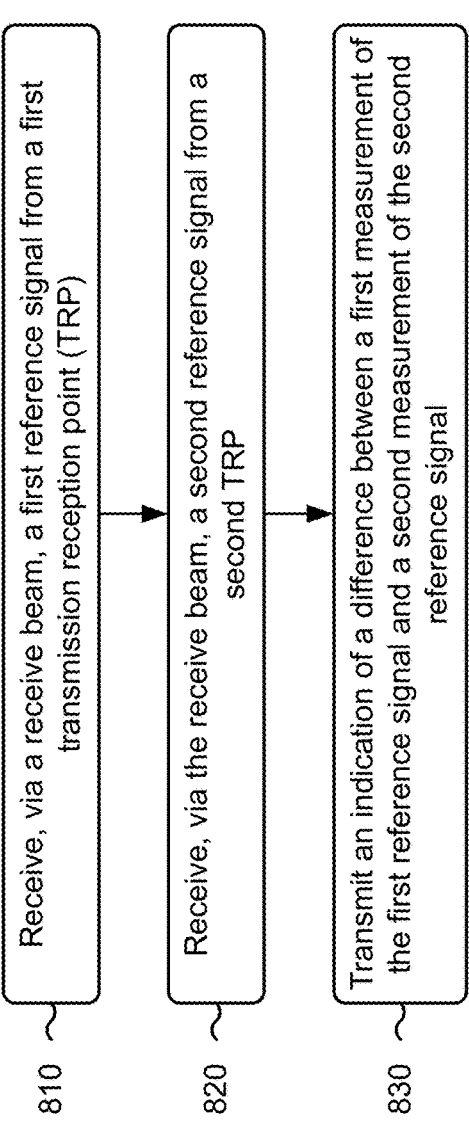
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with cross-beam coupling reporting.

As shown in FIG. 8, in some aspects, process 800 may include receiving, via a receive beam, a first reference signal from a first TRP (block 810). For example, the UE (e.g., using communication manager 160 and/or reception component 1002, depicted in FIG. 10) may receive, via a receive beam, a first reference signal from a first TRP, as described above.

As further shown in FIG. 8, in some aspects, process 800 may include receiving, via the receive beam, a second reference signal from a second TRP (block 820). For example, the UE (e.g., using communication manager 160 and/or reception component 1002, depicted in FIG. 10) may receive, via the receive beam, a second reference signal from a second TRP, as described above.

As further shown in FIG. 8, in some aspects, process 800 may include transmitting an indication of a difference between a first measurement of the first reference signal and a second measurement of the second reference signal (block 830). For example, the UE (e.g., using communication manager 160 and/or transmission component 1004, depicted in FIG. 10) may transmit an indication of a difference between a first measurement of the first reference signal and a second measurement of the second reference signal, as described above.

Process 800 may include additional aspects, such as any single aspect or any combination of aspects described below and/or in connection with one or more other processes described elsewhere herein.

In a first aspect, the receive beam is a first receive beam, and process 800 includes receiving, via a second receive beam, the first reference signal from the first TRP, receiving, via the second receive beam, the second reference signal from the second receive beam, and transmitting an indication of a difference between a third measurement of the second reference signal received via the second receive beam and a fourth measurement of the first reference signal received via the second receive beam.

In a second aspect, alone or in combination with the first aspect, the first receive beam is associated with a first antenna module of the apparatus, and the second receive beam is associated with a second antenna module of the apparatus.

In a third aspect, alone or in combination with one or more of the first and second aspects, process 800 includes transmitting an indication of the first measurement and an indication of the third measurement.

In a fourth aspect, alone or in combination with one or more of the first through third aspects, the first reference signal is received from a first transmit beam of the first TRP, wherein the second reference signal is received from a second transmit beam of the second TRP, and wherein the indication of the difference between the first measurement and the second measurement comprises an indication of cross-beam coupling between the first transmit beam and the second transmit beam.

In a fifth aspect, alone or in combination with one or more of the first through fourth aspects, the first transmit beam and the second transmit beam are wide beams.

In a sixth aspect, alone or in combination with one or more of the first through fifth aspects, the first transmit beam and the second transmit beam are narrow beams.

In a seventh aspect, alone or in combination with one or more of the first through sixth aspects, the first measurement comprises a first reference signal received power (RSRP) measurement of the first reference signal, and the second measurement comprises a second RSRP measurement of the second reference signal.

In an eighth aspect, alone or in combination with one or more of the first through seventh aspects, the difference between the first measurement and the second measurement is quantized to a closest configured reporting value.

In a ninth aspect, alone or in combination with one or more of the first through eighth aspects, selection of the first reference signal and the second reference signal is based at least in part on a UE implementation for the UE.

In a tenth aspect, alone or in combination with one or more of the first through ninth aspects, the difference between the first measurement and the second measurement is based at least in part on a UE implementation for the UE.

In an eleventh aspect, alone or in combination with one or more of the first through tenth aspects, the difference between the first measurement and the second measurement is based at least in part on selection of the first reference signal and the second reference signal.

In a twelfth aspect, alone or in combination with one or more of the first through eleventh aspects, process 800 includes transmitting an indication of the first measurement, wherein a measurement error for the first measurement is less than a threshold margin.

In a thirteenth aspect, alone or in combination with one or more of the first through twelfth aspects, the first reference signal is included in a first reference signal set associated with a first plurality of narrow beams of the first TRP, wherein the second reference signal is included in a second reference signal set associated with a second plurality of narrow beams of the second TRP, and wherein the first reference signal set and the second reference signal set are frequency division multiplexed.

In a fourteenth aspect, alone or in combination with one or more of the first through thirteenth aspects, process 800 includes receiving an indication of a quantity of reference signal pairs for cross-beam coupling reporting, wherein each of the reference signal pairs includes one reference signal from the first reference signal set and one reference signal from the second reference signal set.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
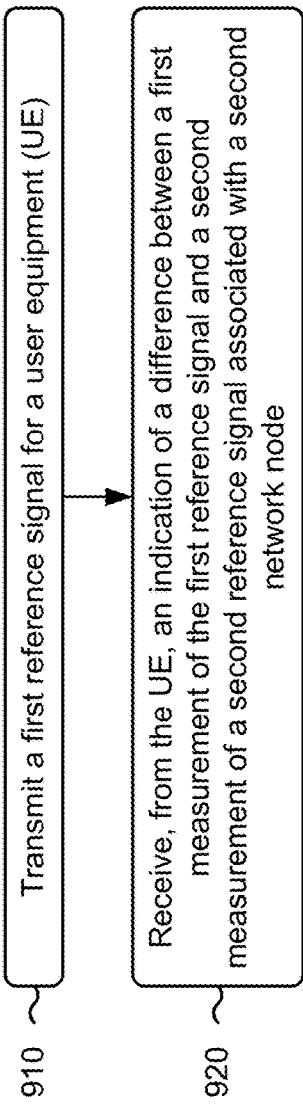
FIG. 9 is a diagram illustrating an example process performed, for example, by a first network node, in accordance with the present disclosure.

FIG. 9 is a diagram illustrating an example process 900 performed, for example, by a first network node, in accordance with the present disclosure. Example process 900 is an example where the first network node (e.g., first network node 110) performs operations associated with cross-beam coupling reporting.

As shown in FIG. 9, in some aspects, process 900 may include transmitting a first reference signal for a UE (block 910). For example, the first network node (e.g., using communication manager 170 and/or transmission component 1304, depicted in FIG. 13) may transmit a first reference signal for a UE, as described above.

As further shown in FIG. 9, in some aspects, process 900 may include receiving, from the UE, an indication of a difference between a first measurement of the first reference signal and a second measurement of a second reference signal associated with a second network node (block 920). For example, the first network node (e.g., using communication manager 170 and/or reception component 1302, depicted in FIG. 13) may receive, from the UE, an indication of a difference between a first measurement of the first reference signal and a second measurement of a second reference signal associated with a second network node, as described above.

Process 900 may include additional aspects, such as any single aspect or any combination of aspects described below and/or in connection with one or more other processes described elsewhere herein.

In a first aspect, the difference between the first measurement and the second measurement is associated with a first receive beam of the UE, and process 900 includes receiving, from the UE, an indication of a difference between a third measurement of the second reference signal and a fourth measurement of the first reference signal, wherein the difference between the third measurement and the fourth measurement is associated with a second receive beam of the UE.

In a second aspect, alone or in combination with the first aspect, process 900 includes receiving, from the UE, an indication of the first measurement and an indication of the third measurement.

In a third aspect, alone or in combination with one or more of the first and second aspects, the first reference signal is associated with a first transmit beam of the first network node, wherein the second reference signal is associated with a second transmit beam of the second network node, and wherein the indication of the difference between the first measurement and the second measurement comprises an indication of cross-beam coupling between the first transmit beam and the second transmit beam.

In a fourth aspect, alone or in combination with one or more of the first through third aspects, the first transmit beam and the second transmit beam are wide beams.

In a fifth aspect, alone or in combination with one or more of the first through fourth aspects, the first transmit beam and the second transmit beam are narrow beams.

In a sixth aspect, alone or in combination with one or more of the first through fifth aspects, the first measurement comprises a first RSRP measurement of the first reference signal, and the second measurement comprises a second RSRP measurement of the second reference signal.

In a seventh aspect, alone or in combination with one or more of the first through sixth aspects, the difference between the first measurement and the second measurement is quantized to a nearest configured reporting value.

In an eighth aspect, alone or in combination with one or more of the first through seventh aspects, selection of the first reference signal is among a plurality of reference signals transmitted by the first network node on a plurality of transmit beams.

In a ninth aspect, alone or in combination with one or more of the first through eighth aspects, the difference between the first measurement and the second measurement is based at least in part on a UE implementation for the UE.

In a tenth aspect, alone or in combination with one or more of the first through ninth aspects, the difference between the first measurement and the second measurement is based at least in part on selection of the first reference signal and the second reference signal.

In an eleventh aspect, alone or in combination with one or more of the first through tenth aspects, process 900 includes receiving, from the UE, an indication of the first measurement, wherein a measurement error for the first measurement is less than a threshold margin.

In a twelfth aspect, alone or in combination with one or more of the first through eleventh aspects, the first reference signal is included in a first reference signal set associated with a first plurality of narrow beams of the first network node, wherein the second reference signal is included in a second reference signal set associated with a second plurality of narrow beams of the second network node, and wherein the first reference signal set and the second reference signal set are frequency division multiplexed.

In a thirteenth aspect, alone or in combination with one or more of the first through twelfth aspects, process 900 includes transmitting, to the UE, an indication of a quantity of reference signal pairs for which to report cross-beam coupling, wherein each of the reference signal pairs includes one reference signal from the first reference signal set and one reference signal from the second reference signal set.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
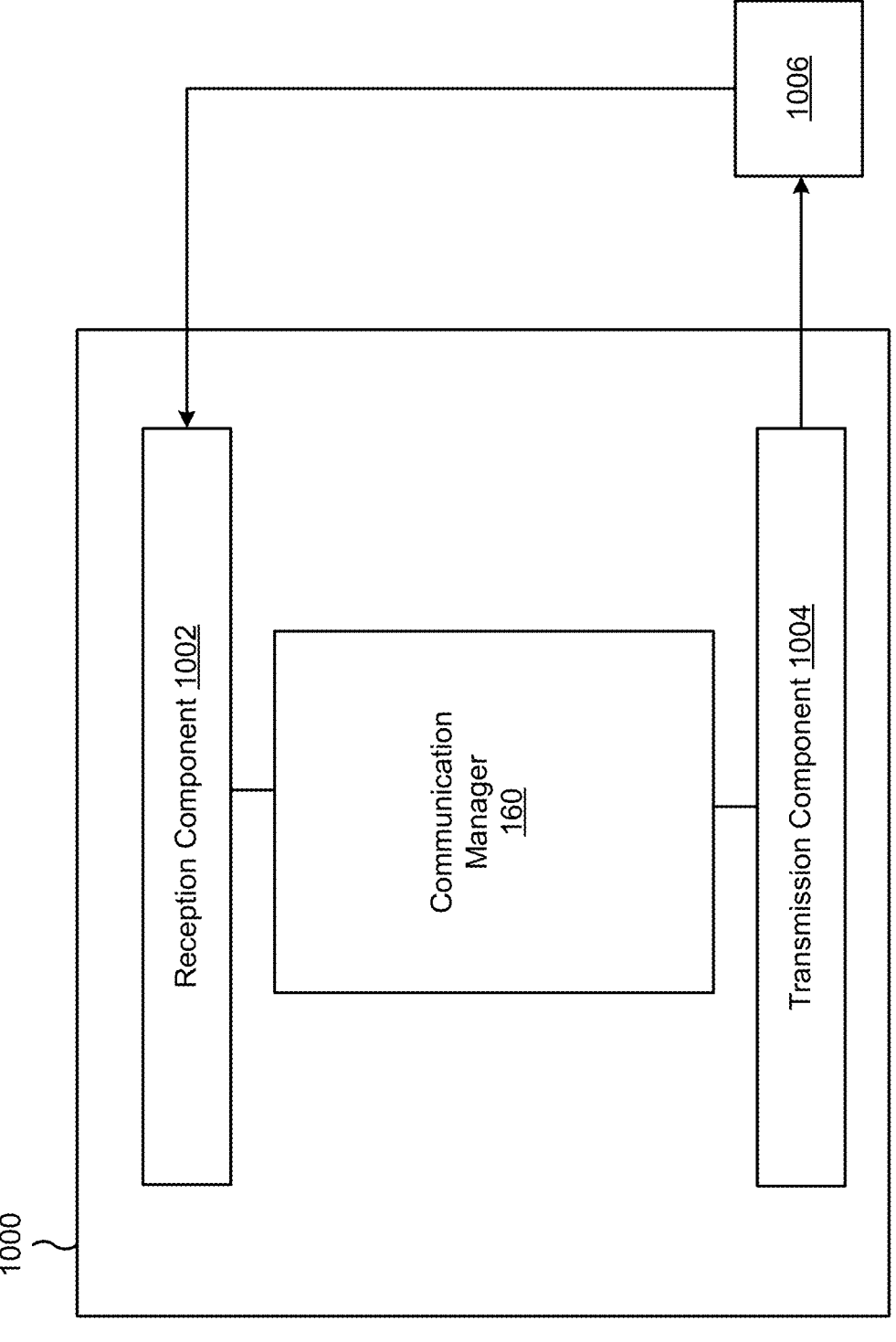
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE 120, or a UE 120 may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE 120, a network node 110, an RU 340, a TRP 435, or another wireless communication device) using the reception component 1002 and the transmission component 1004. As further shown, the apparatus 1000 may include the communication manager 160.

In some aspects, the apparatus 1000 may be configured to perform one or more operations described herein in connection with FIGS. 5-7D. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, via a receive beam, a first reference signal from a first apparatus 1006. The reception component 1002 may 1002 may receive, via the receive beam, a second reference signal from a second apparatus 1006.

The transmission component 1004 may transmit an indication of a difference between a first measurement of the first reference signal and a second measurement of the second reference signal.

The transmission component 1004 may transmit an indication of the first measurement and an indication of the third measurement. The transmission component 1004 may transmit an indication of the first measurement wherein a measurement error for the first measurement is less than a threshold margin.

The reception component 1002 may receive an indication of a quantity of reference signal pairs for cross-beam coupling reporting, wherein each of the reference signal pairs includes one reference signal from the first reference signal set and one reference signal from the second reference signal set.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
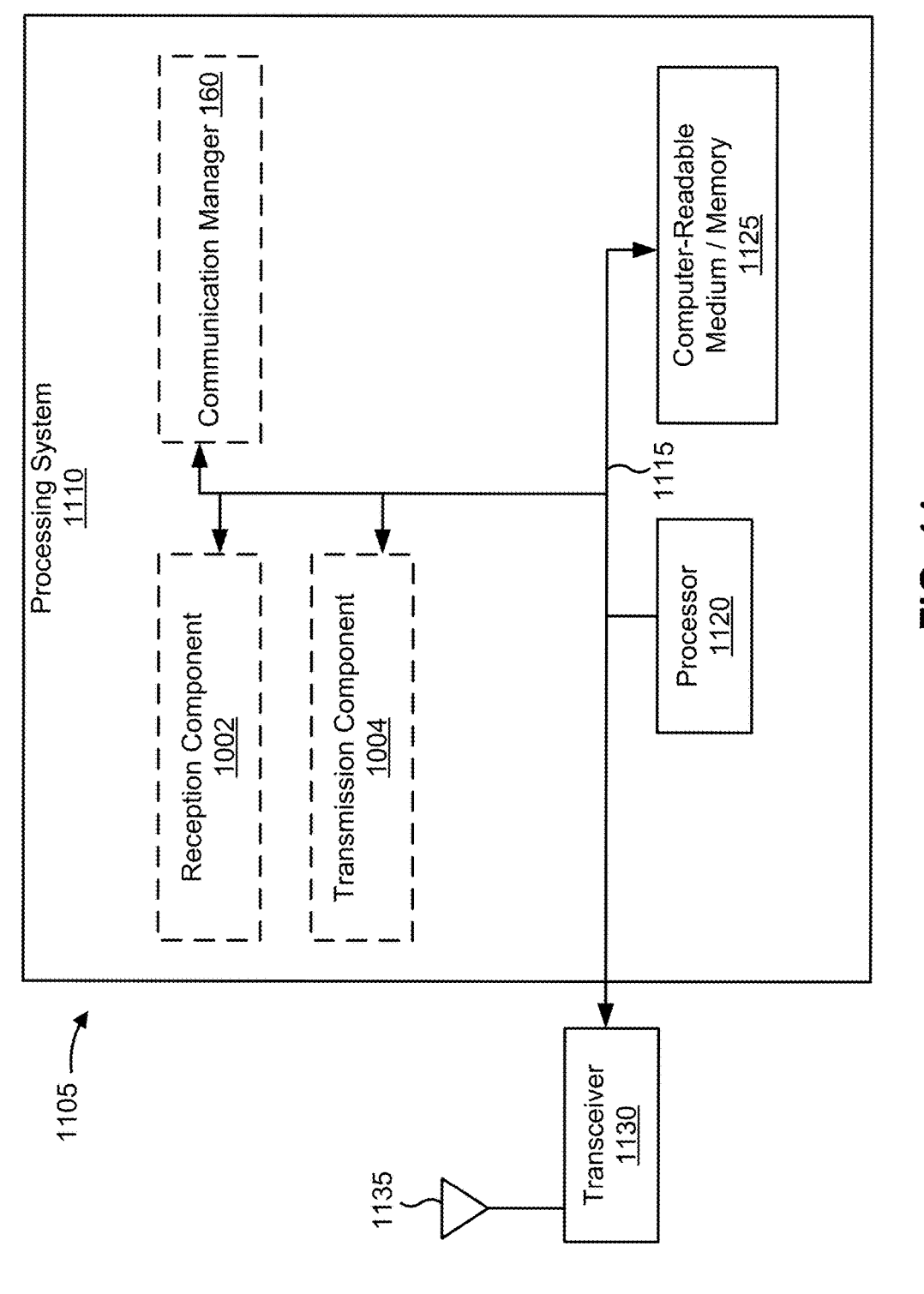
FIG. 11 is a diagram illustrating an example of a hardware implementation for an apparatus employing a processing system, in accordance with the present disclosure.

FIG. 11 is a diagram illustrating an example 1100 of a hardware implementation for an apparatus 1105 employing a processing system 1110, in accordance with the present disclosure. The apparatus 1105 may be a UE 120.

The processing system 1110 may be implemented with a bus architecture, represented generally by the bus 1115. The bus 1115 may include any number of interconnecting buses and bridges depending on the specific application of the processing system 1110 and the overall design constraints. The bus 1115 links together various circuits including one or more processors and/or hardware components, represented by the processor 1120, the illustrated components, and the computer-readable medium/memory 1125. The bus 1115 may also link various other circuits, such as timing sources, peripherals, voltage regulators, and/or power management circuits.

The processing system 1110 may be coupled to a transceiver 1130. The transceiver 1130 is coupled to one or more antennas 1135. The transceiver 1130 provides a means for communicating with various other apparatuses over a transmission medium. The transceiver 1130 receives a signal from the one or more antennas 1135, extracts information from the received signal, and provides the extracted information to the processing system 1110, specifically the reception component 1002. In addition, the transceiver 1130 receives information from the processing system 1110, specifically the transmission component 1004, and generates a signal to be applied to the one or more antennas 1135 based at least in part on the received information.

The processing system 1110 includes a processor 1120 coupled to a computer-readable medium/memory 1125. The processor 1120 is responsible for general processing, including the execution of software stored on the computer-readable medium/memory 1125. The software, when executed by the processor 1120, causes the processing system 1110 to perform the various functions described herein for any particular apparatus. The computer-readable medium/memory 1125 may also be used for storing data that is manipulated by the processor 1120 when executing software. The processing system further includes at least one of the illustrated components. The components may be software modules running in the processor 1120, resident/stored in the computer readable medium/memory 1125, one or more hardware modules coupled to the processor 1120, or some combination thereof.

In some aspects, the processing system 1110 may be a component of the UE 120 and may include the memory 282 and/or at least one of the TX MIMO processor 266, the RX processor 258, and/or the controller/processor 280. In some aspects, the apparatus 1105 for wireless communication includes means for receiving, via a receive beam, a first reference signal from a first TRP; means for receiving, via the receive beam, a second reference signal from a second TRP; and/or means for transmitting an indication of a difference between a first measurement of the first reference signal and a second measurement of the second reference signal. The aforementioned means may be one or more of the aforementioned components of the apparatus 1000 and/or the processing system 1110 of the apparatus 1105 configured to perform the functions recited by the aforementioned means. As described elsewhere herein, the processing system 1110 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

Figure 12:
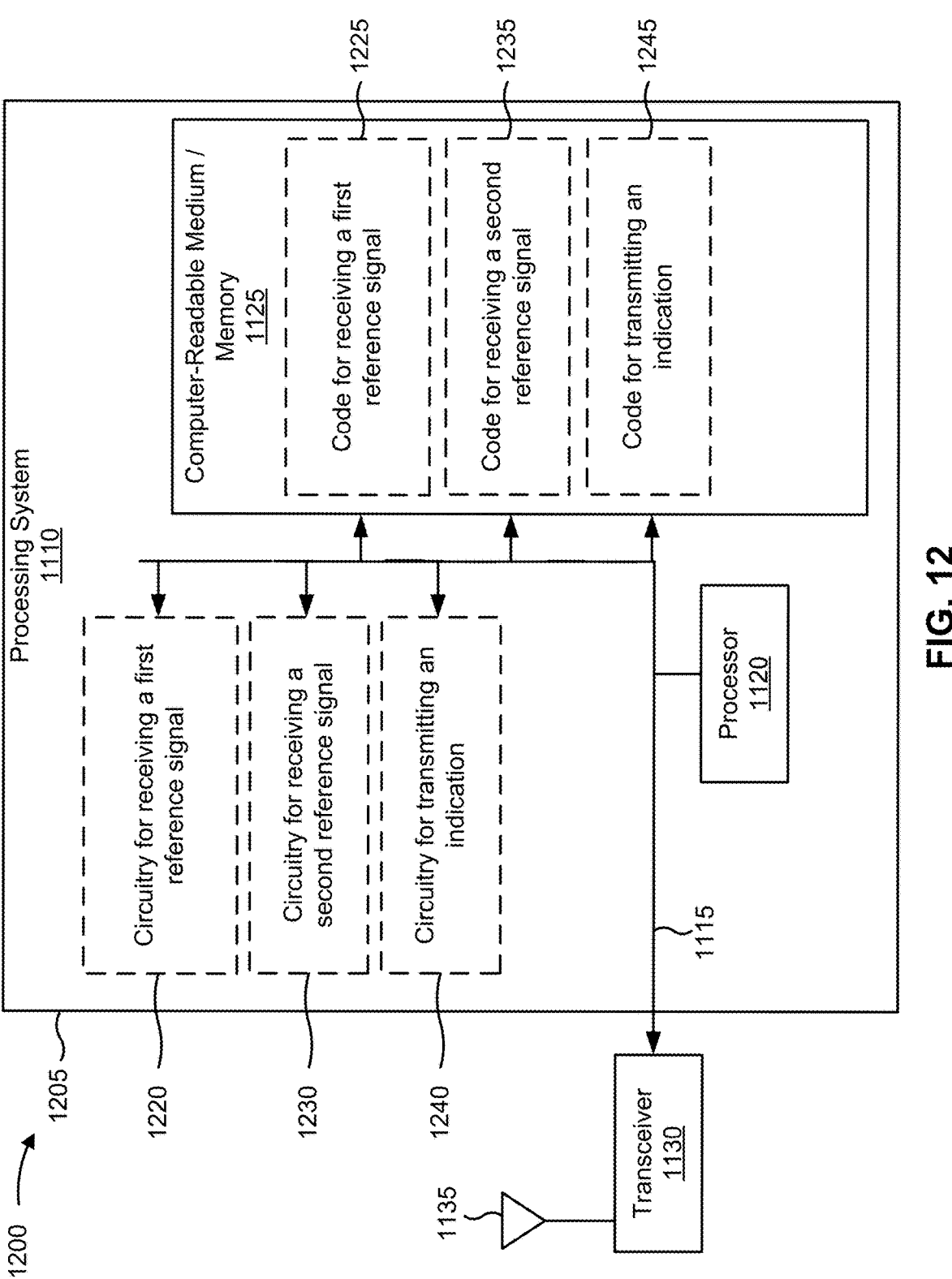
FIG. 12 is a diagram illustrating an example of an implementation of code and circuitry for an apparatus, in accordance with the present disclosure.

FIG. 12 is a diagram illustrating an example 1200 of an implementation of code and circuitry for an apparatus 1205, in accordance with the present disclosure. The apparatus 1205 may be a UE, or a UE may include the apparatus 1205.

As shown in FIG. 12, the apparatus 1205 may include circuitry for receiving, via a receive beam, a first reference signal from a first TRP (circuitry 1220). For example, the circuitry 1220 may enable the apparatus 1205 to receive, via a receive beam, a first reference signal from a first TRP.

As shown in FIG. 12, the apparatus 1205 may include, stored in computer-readable medium 1125, code for receiving, via a receive beam, a first reference signal from a first TRP (code 1225). For example, the code 1225, when executed by processor 1120, may cause processor 1120 to cause transceiver 1130 to receive, via a receive beam, a first reference signal from a first TRP.

As shown in FIG. 12, the apparatus 1205 may include circuitry for receiving, via the receive beam, a second reference signal from a second TRP (circuitry 1230). For example, the circuitry 1230 may enable the apparatus 1205 to receive, via the receive beam, a second reference signal from a second TRP.

As shown in FIG. 12, the apparatus 1205 may include, stored in computer-readable medium 1125, code for receiving, via the receive beam, a second reference signal from a second TRP (code 1235). For example, the code 1235, when executed by processor 1120, may cause processor 1120 to cause transceiver 1130 to receive, via the receive beam, a second reference signal from a second TRP.

As shown in FIG. 12, the apparatus 1205 may include circuitry for transmitting an indication of a difference between a first measurement of the first reference signal and a second measurement of the second reference signal (circuitry 1240). For example, the circuitry 1240 may enable the apparatus 1205 to transmit an indication of a difference between a first measurement of the first reference signal and a second measurement of the second reference signal.

As shown in FIG. 12, the apparatus 1205 may include, stored in computer-readable medium 1125, code for transmitting an indication of a difference between a first measurement of the first reference signal and a second measurement of the second reference signal (code 1245). For example, the code 1245, when executed by processor 1120, may cause processor 1120 to cause transceiver 1130 to transmit an indication of a difference between a first measurement of the first reference signal and a second measurement of the second reference signal.

FIG. 12 is provided as an example. Other examples may differ from what is described in connection with FIG. 12.

Figure 13:
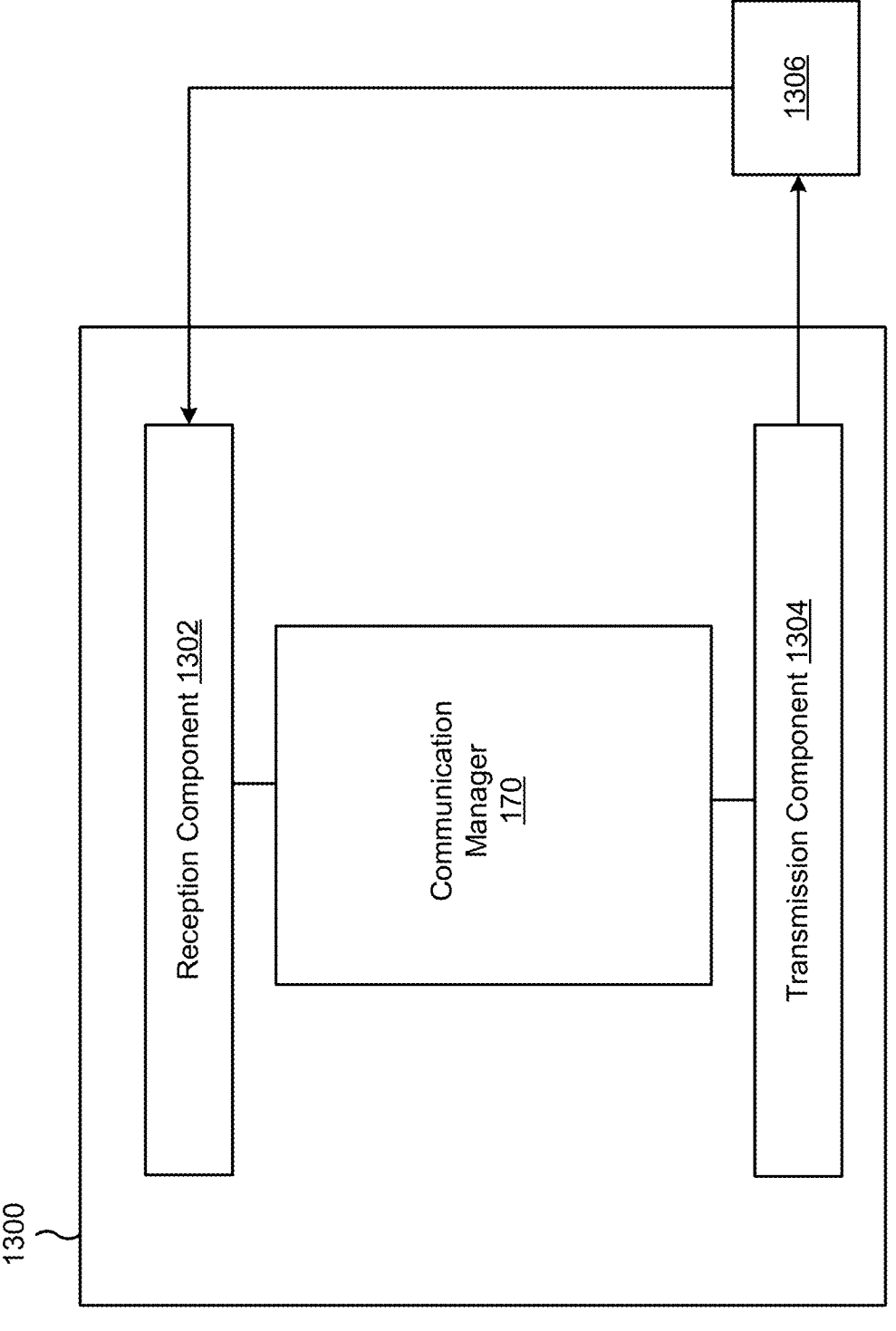
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node 110, an RU 340, or a TRP 435; or a network node 110, an RU 340, or a TRP 435 may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE 120, a network node 110, an RU 340, a TRP 435, or another wireless communication device) using the reception component 1302 and the transmission component 1304. As further shown, the apparatus 1300 may include the communication manager 170.

In some aspects, the apparatus 1300 may be configured to perform one or more operations described herein in connection with FIGS. 5A-7D. Additionally, or alternatively, the apparatus 1300 may be configured to perform one or more processes described herein, such as process 900 of FIG. 9. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The transmission component 1304 may transmit a first reference signal for an apparatus 1306. The reception component 1302 may receive, from the apparatus 1306, an indication of a difference between a first measurement of the first reference signal and a second measurement of a second reference signal associated with another apparatus 1306.

The reception component 1302 may receive, from the apparatus 1306, an indication of the first measurement and an indication of the third measurement. The reception component 1302 may receive, from the apparatus 1306, an indication of the first measurement, wherein a measurement error for the first measurement is less than a threshold margin.

The transmission component 1304 may transmit, to the apparatus 1306, an indication of a quantity of reference signal pairs for which to report cross-beam coupling, wherein each of the reference signal pairs includes one reference signal from the first reference signal set and one reference signal from the second reference signal set.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
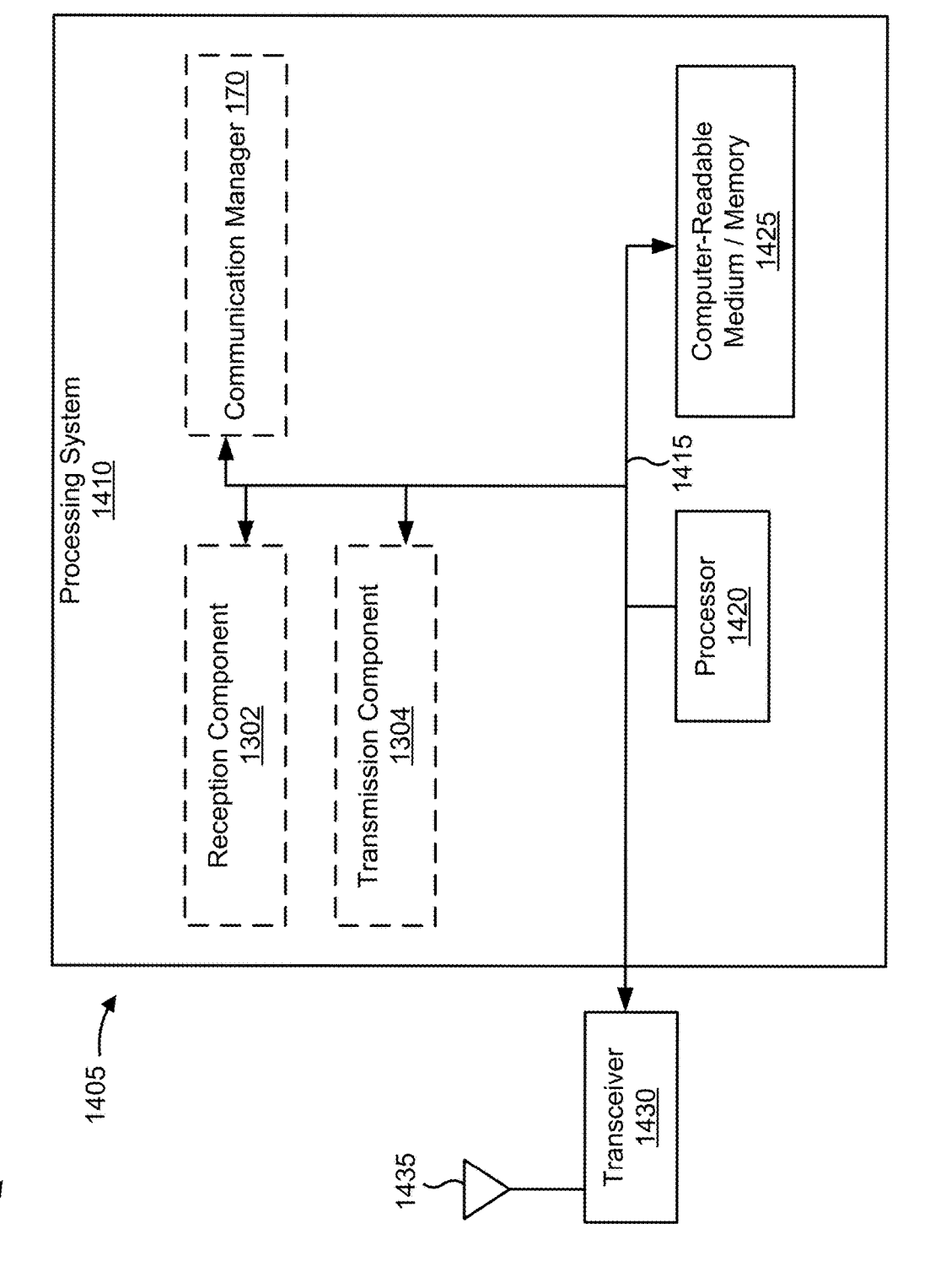
FIG. 14 is a diagram illustrating an example of a hardware implementation for an apparatus employing a processing system, in accordance with the present disclosure.

FIG. 14 is a diagram illustrating an example 1400 of a hardware implementation for an apparatus 1405 employing a processing system 1410, in accordance with the present disclosure. The apparatus 1405 may be a network node 110, an RU 340, or a TRP 435; or a network node 110, an RU 340, or a TRP 435 may include an apparatus 1405.

The processing system 1410 may be implemented with a bus architecture, represented generally by the bus 1415. The bus 1415 may include any number of interconnecting buses and bridges depending on the specific application of the processing system 1410 and the overall design constraints. The bus 1415 links together various circuits including one or more processors and/or hardware components, represented by the processor 1420, the illustrated components, and the computer-readable medium/memory 1425. The bus 1415 may also link various other circuits, such as timing sources, peripherals, voltage regulators, and/or power management circuits.

The processing system 1410 may be coupled to a transceiver 1430. The transceiver 1430 is coupled to one or more antennas 1435. The transceiver 1430 provides a means for communicating with various other apparatuses over a transmission medium. The transceiver 1430 receives a signal from the one or more antennas 1435, extracts information from the received signal, and provides the extracted information to the processing system 1410, specifically the reception component 1302. In addition, the transceiver 1430 receives information from the processing system 1410, specifically the transmission component 1304, and generates a signal to be applied to the one or more antennas 1435 based at least in part on the received information.

The processing system 1410 includes a processor 1420 coupled to a computer-readable medium/memory 1425. The processor 1420 is responsible for general processing, including the execution of software stored on the computer-readable medium/memory 1425. The software, when executed by the processor 1420, causes the processing system 1410 to perform the various functions described herein for any particular apparatus. The computer-readable medium/memory 1425 may also be used for storing data that is manipulated by the processor 1420 when executing software. The processing system further includes at least one of the illustrated components. The components may be software modules running in the processor 1420, resident/stored in the computer readable medium/memory 1425, one or more hardware modules coupled to the processor 1420, or some combination thereof.

In some aspects, the processing system 1410 may be a component of the network node 110 and may include the memory 242 and/or at least one of the TX MIMO processor 230, the RX processor 238, and/or the controller/processor 240. In some aspects, the apparatus 1405 for wireless communication includes means for transmitting a first reference signal for a UE; and receiving, from the UE, an indication of a difference between a first measurement of the first reference signal and a second measurement of a second reference signal associated with a network node. The aforementioned means may be one or more of the aforementioned components of the apparatus 1300 and/or the processing system 1410 of the apparatus 1405 configured to perform the functions recited by the aforementioned means. As described elsewhere herein, the processing system 1410 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 14 is provided as an example. Other examples may differ from what is described in connection with FIG. 14.

Figure 15:
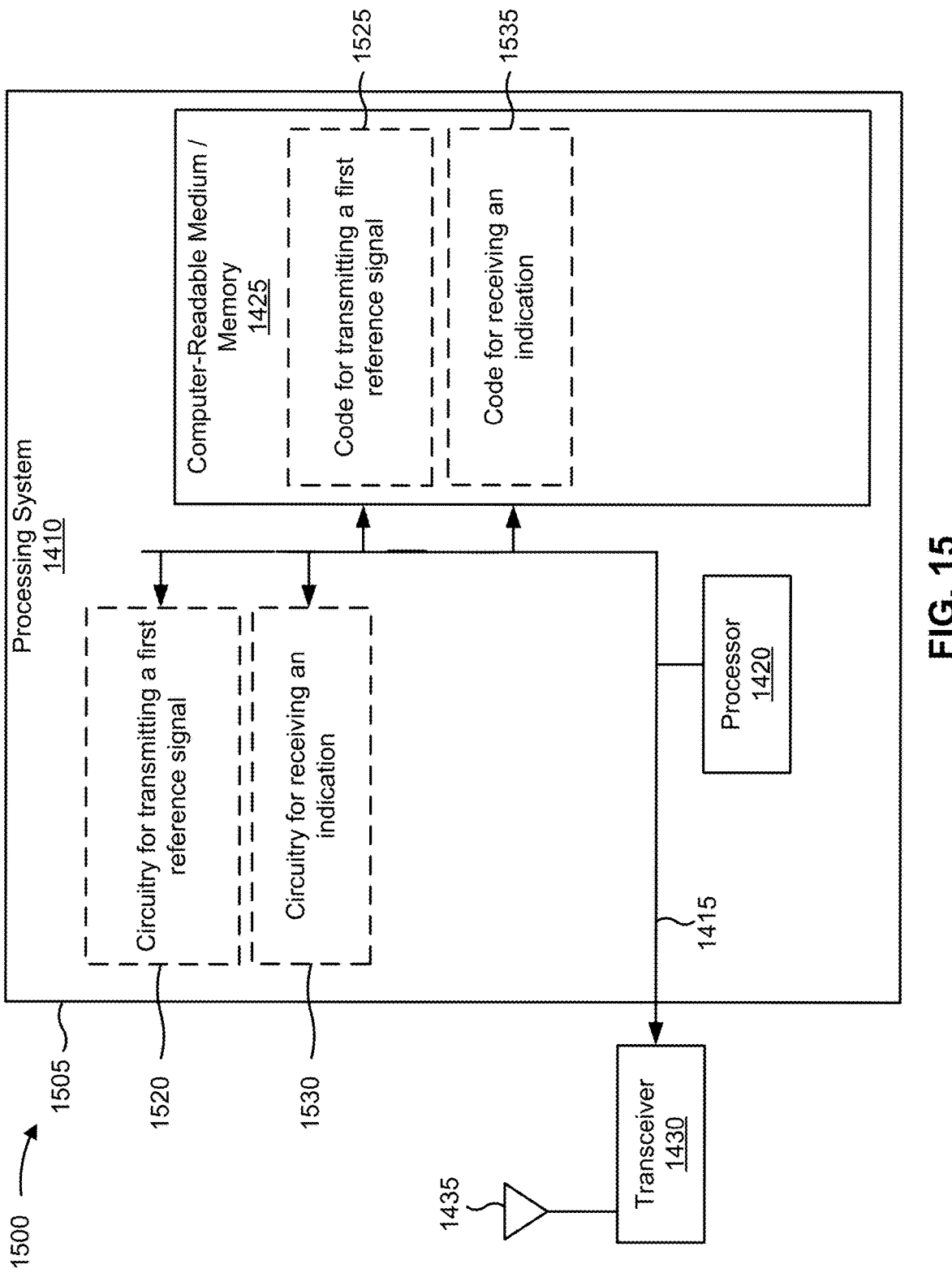
FIG. 15 is a diagram illustrating an example of an implementation of code and circuitry for an apparatus, in accordance with the present disclosure.

FIG. 15 is a diagram illustrating an example 1500 of an implementation of code and circuitry for an apparatus 1505, in accordance with the present disclosure. The apparatus 1505 may be a network node 110, an RU 340, or a TRP 435; or a network node 110, an RU 340, or a TRP 435 may include the apparatus 1505.

As shown in FIG. 15, the apparatus 1505 may include circuitry for transmitting a first reference signal for a UE (circuitry 1520). For example, the circuitry 1520 may 1520 may enable the apparatus 1505 to transmit a first reference signal for a UE.

As shown in FIG. 15, the apparatus 1505 may include, stored in computer-readable medium 1425, code for transmitting a first reference signal for a UE (code 1525). For example, the code 1525, when executed by processor 1420, may cause processor 1420 to cause transceiver 1430 to transmit a first reference signal for a UE.

As shown in FIG. 15, the apparatus 1505 may include circuitry for receiving, from the UE, an indication of a difference between a first measurement of the first reference signal and a second measurement of a second reference signal associated with a network node (circuitry 1530). For example, the circuitry 1530 may enable the apparatus 1505 to receive, from the UE, an indication of a difference between a first measurement of the first reference signal and a second measurement of a second reference signal associated with a network node.

As shown in FIG. 15, the apparatus 1505 may include, stored in computer-readable medium 1425, code for receiving, from the UE, an indication of a difference between a first measurement of the first reference signal and a second measurement of a second reference signal associated with a network node (code 1535). For example, the code 1535, when executed by processor 1420, may cause processor 1420 to cause transceiver 1430 to receive, from the UE, an indication of a difference between a first measurement of the first reference signal and a second measurement of a second reference signal associated with a network node.

FIG. 15 is provided as an example. Other examples may differ from what is described in connection with FIG. 15.

Figure 16:
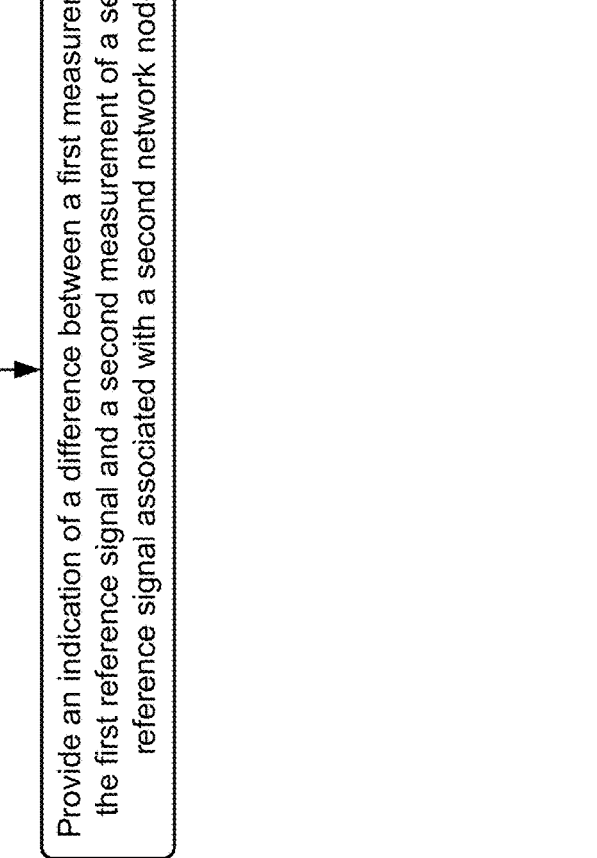
FIG. 16 is a diagram illustrating an example process performed, for example, by a first network node, in accordance with the present disclosure.

FIG. 16 is a diagram illustrating an example process 1600 performed, for example, by a first network node, in accordance with the present disclosure. Example process 1600 is an example where the first network node (e.g., first network node 110) performs operations associated with cross-beam coupling reporting.

As shown in FIG. 16, in some aspects, process 1600 may include providing a first reference signal for a UE (block 1610). For example, the first network node (e.g., using communication manager 170 and/or transmission component 1704, depicted in FIG. 13) may provide a first reference signal for a UE, as described above.

As further shown in FIG. 16, in some aspects, process 1600 may include obtaining an indication of a difference between a first measurement of the first reference signal and a second measurement of a second reference signal associated with a second network node (block 1620). For example, the first network node (e.g., using communication manager 170 and/or reception component 1702, depicted in FIG. 13) may obtain an indication of a difference between a first measurement of the first reference signal and a second measurement of a second reference signal associated with a second network node, as described above.

Process 1600 may include additional aspects, such as any single aspect or any combination of aspects described below and/or in connection with one or more other processes described elsewhere herein.

In a first aspect, the difference between the first measurement and the second measurement is associated with a first receive beam of the UE, and process 1600 includes obtaining an indication of a difference between a third measurement of the second reference signal and a fourth measurement of the first reference signal, wherein the difference between the third measurement and the fourth measurement is associated with a second receive beam of the UE.

In a second aspect, alone or in combination with the first aspect, process 1600 includes obtaining an indication of the first measurement and an indication of the third measurement.

In a third aspect, alone or in combination with one or more of the first and second aspects, the first reference signal is associated with a first transmit beam of the first network node, wherein the second reference signal is associated with a second transmit beam of the second network node, and wherein the indication of the difference between the first measurement and the second measurement comprises an indication of cross-beam coupling between the first transmit beam and the second transmit beam.

In a fourth aspect, alone or in combination with one or more of the first through third aspects, the first transmit beam and the second transmit beam are wide beams.

In a fifth aspect, alone or in combination with one or more of the first through fourth aspects, the first transmit beam and the second transmit beam are narrow beams.

In a sixth aspect, alone or in combination with one or more of the first through fifth aspects, the first measurement comprises a first RSRP measurement of the first reference signal, and the second measurement comprises a second RSRP measurement of the second reference signal.

In a seventh aspect, alone or in combination with one or more of the first through sixth aspects, the difference between the first measurement and the second measurement is quantized to a nearest configured reporting value.

In an eighth aspect, alone or in combination with one or more of the first through seventh aspects, selection of the first reference signal is among a plurality of reference signals transmitted by the first network node on a plurality of transmit beams.

In a ninth aspect, alone or in combination with one or more of the first through eighth aspects, the difference between the first measurement and the second measurement is based at least in part on a UE implementation for the UE.

In a tenth aspect, alone or in combination with one or more of the first through ninth aspects, the difference between the first measurement and the second measurement is based at least in part on selection of the first reference signal and the second reference signal.

In an eleventh aspect, alone or in combination with one or more of the first through tenth aspects, process 1600 includes obtaining an indication of the first measurement, wherein a measurement error for the first measurement is less than a threshold margin.

In a twelfth aspect, alone or in combination with one or more of the first through eleventh aspects, the first reference signal is included in a first reference signal set associated with a first plurality of narrow beams of the first network node, wherein the second reference signal is included in a second reference signal set associated with a second plurality of narrow beams of the second network node, and wherein the first reference signal set and the second reference signal set are frequency division multiplexed.

In a thirteenth aspect, alone or in combination with one or more of the first through twelfth aspects, process 1600 includes providing an indication of a quantity of reference signal pairs for which to report cross-beam coupling, wherein each of the reference signal pairs includes one reference signal from the first reference signal set and one reference signal from the second reference signal set.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
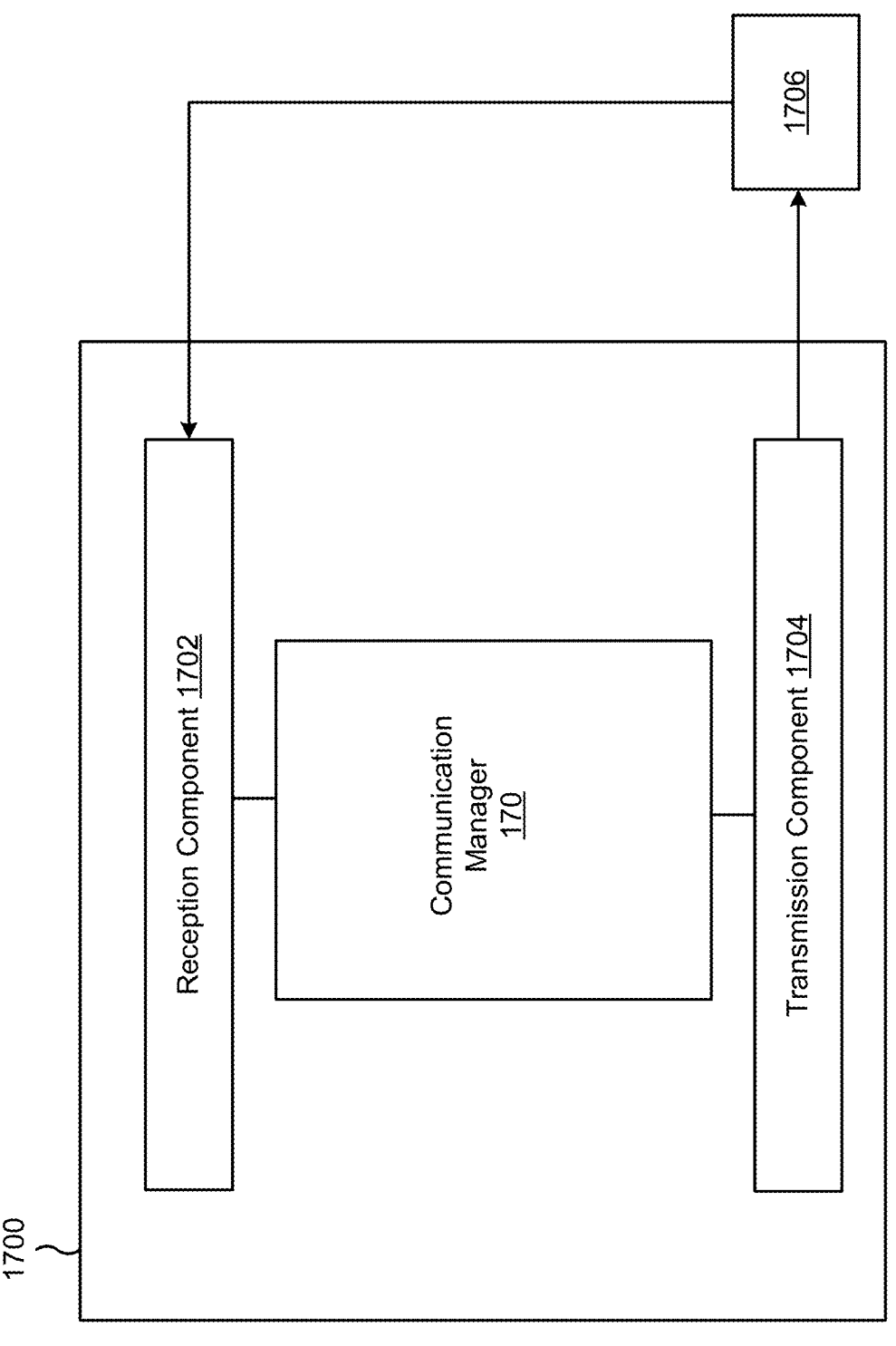
FIG. 17 is a diagram of an example apparatus for wireless communication, in accordance with the present disclosure.

FIG. 17 is a diagram of an example apparatus 1700 for wireless communication, in accordance with the present disclosure. The apparatus 1700 may be a network node 110, an RU 340, or a TRP 435; or a network node 110, an RU 340, or a TRP 435 may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE 120, a network node 110, an RU 340, a TRP 435, or another wireless communication device) using the reception component 1702 and the transmission component 1704. As further shown, the apparatus 1700 may include the communication manager 170.

In some aspects, the apparatus 1700 may be configured to perform one or more operations described herein in connection with FIGS. 5A-7D. Additionally, or alternatively, the apparatus 1700 may be configured to perform one or more processes described herein, such as process 1600 of FIG. 16. In some aspects, the apparatus 1700 and/or one or more components shown in FIG. 17 may include one or more components of the network node described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the network node described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/ processor, a memory, or a combination thereof, of the network node described in connection with FIG. 2. In some aspects, the transmission component 1704 may be co-located with the reception component 1702 in a transceiver.

The transmission component 1704 may provide a first reference signal for an apparatus 1706. The reception component 1702 may obtain an indication of a difference between a first measurement of the first reference signal and a second measurement of a second reference signal associated with another apparatus 1706.

The reception component 1702 may obtain an indication of the first measurement and an indication of the third measurement. The reception component 1702 may obtain an indication of the first measurement, wherein a measurement error for the first measurement is less than a threshold margin.

The transmission component 1704 may provide an indication of a quantity of reference signal pairs for which to report cross-beam coupling, wherein each of the reference signal pairs includes one reference signal from the first reference signal set and one reference signal from the second reference signal set.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
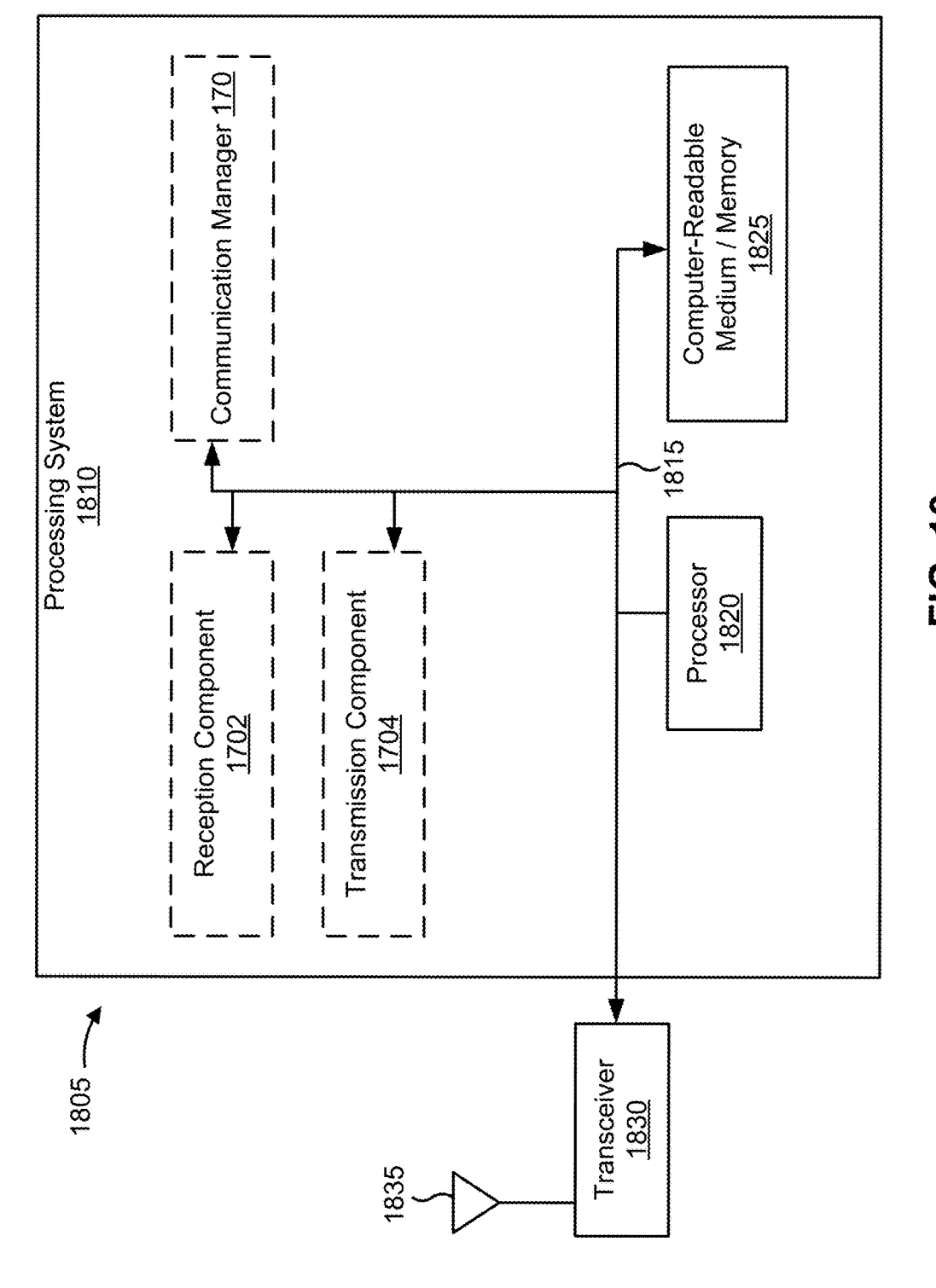
FIG. 18 is a diagram illustrating an example of a hardware implementation for an apparatus employing a processing system, in accordance with the present disclosure.

FIG. 18 is a diagram illustrating an example 1800 of a hardware implementation for an apparatus 1805 employing a processing system 1810, in accordance with the present disclosure. The apparatus 1805 may be a network node 110, an RU 340, or a TRP 435; or a network node 110, an RU 340, or a TRP 435 may include an apparatus 1805.

The processing system 1810 may be implemented with a bus architecture, represented generally by the bus 1815. The bus 1815 may include any number of interconnecting buses and bridges depending on the specific application of the processing system 1810 and the overall design constraints. The bus 1815 links together various circuits including one or more processors and/or hardware components, represented by the processor 1820, the illustrated components, and the computer-readable medium/memory 1825. The bus 1815 may also link various other circuits, such as timing sources, peripherals, voltage regulators, and/or power management circuits.

The processing system 1810 may be coupled to a transceiver 1830. The transceiver 1830 is coupled to one or more antennas 1835. The transceiver 1830 provides a means for communicating with various other apparatuses over a transmission medium. The transceiver 1830 receives a signal from the one or more antennas 1835, extracts information from the received signal, and provides the extracted information to the processing system 1810, specifically the reception component 1702. In addition, the transceiver 1830 receives information from the processing system 1810, specifically the transmission component 1704, and generates a signal to be applied to the one or more antennas 1835 based at least in part on the received information.

The processing system 1810 includes a processor 1820 coupled to a computer-readable medium/memory 1825. The processor 1820 is responsible for general processing, including the execution of software stored on the computer-readable medium/memory 1825. The software, when executed by the processor 1820, causes the processing system 1810 to perform the various functions described herein for any particular apparatus. The computer-readable medium/memory 1825 may also be used for storing data that is manipulated by the processor 1820 when executing software. The processing system further includes at least one of the illustrated components. The components may be software modules running in the processor 1820, resident/stored in the computer readable medium/memory 1825, one or more hardware modules coupled to the processor 1820, or some combination thereof.

In some aspects, the processing system 1810 may be a component of the network node 110 and may include the memory 242 and/or at least one of the TX MIMO processor 230, the RX processor 238, and/or the controller/processor 240. In some aspects, the apparatus 1805 for wireless communication includes means for providing a first reference signal for a UE; and obtaining an indication of a difference between a first measurement of the first reference signal and a second measurement of a second reference signal associated with a network node. The aforementioned means may be one or more of the aforementioned components of the apparatus 1700 and/or the processing system 1810 of the apparatus 1805 configured to perform the functions recited by the aforementioned means. As described elsewhere herein, the processing system 1810 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 18 is provided as an example. Other examples may differ from what is described in connection with FIG. 18.

Figure 19:
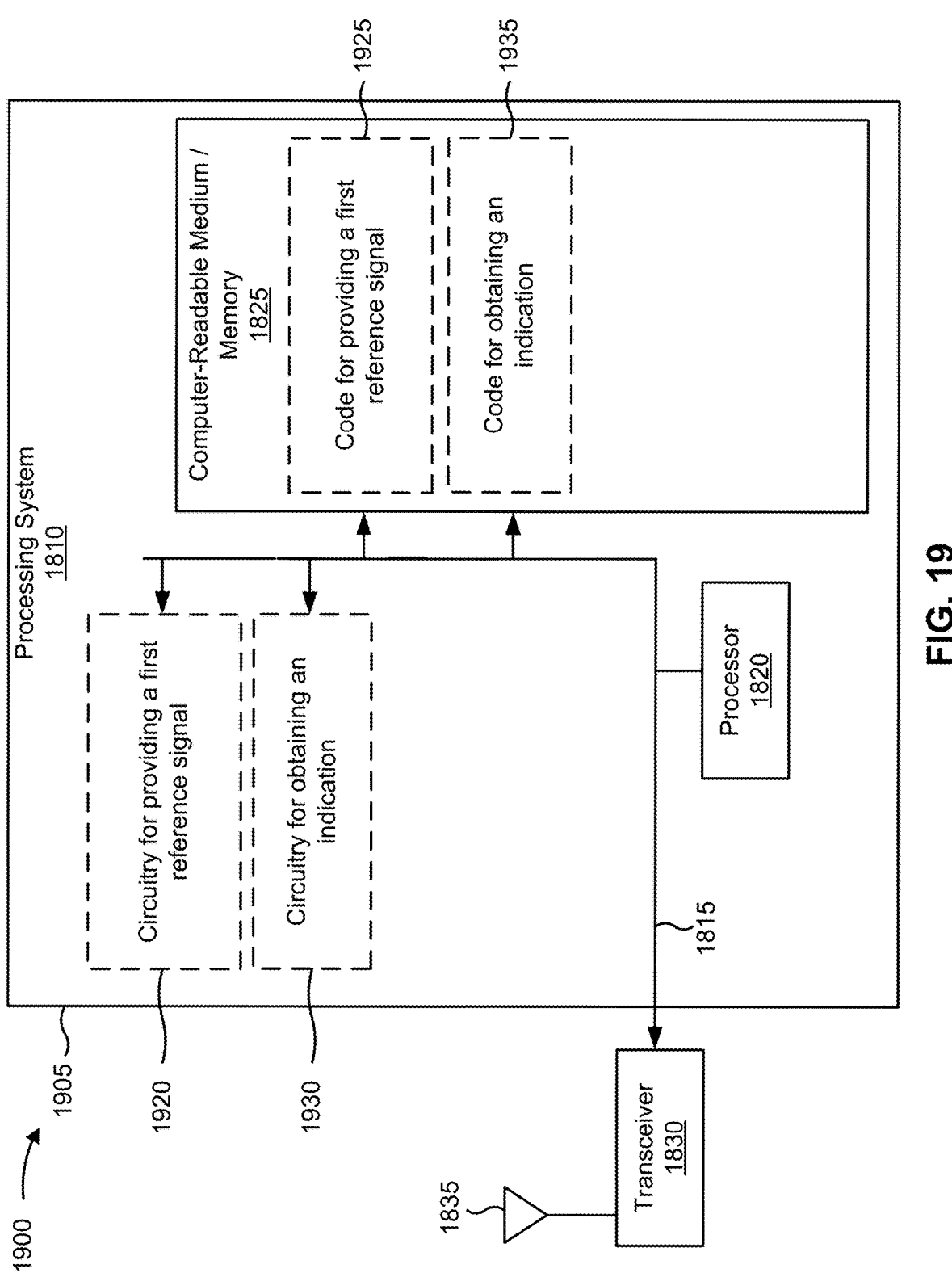
FIG. 19 is a diagram illustrating an example of an implementation of code and circuitry for an apparatus, in accordance with the present disclosure.

FIG. 19 is a diagram illustrating an example 1900 of an implementation of code and circuitry for an apparatus 1905, in accordance with the present disclosure. The apparatus 1905 may be a network node 110, an RU 340, or a TRP 435; or a network node 110, an RU 340, or a TRP 435 may include the apparatus 1905.

As shown in FIG. 19, the apparatus 1905 may include circuitry for providing a first reference signal for a UE (circuitry 1920). For example, the circuitry 1920 may 1920 may enable the apparatus 1905 to provide a first reference signal for a UE.

As shown in FIG. 19, the apparatus 1905 may include, stored in computer-readable medium 1825, code for providing a first reference signal for a UE (code 1925). For example, the code 1925, when executed by processor 1820, may cause processor 1820 to cause transceiver 1830 to provide a first reference signal for a UE.

As shown in FIG. 19, the apparatus 1905 may include circuitry for obtaining an indication of a difference between a first measurement of the first reference signal and a second measurement of a second reference signal associated with a network node (circuitry 1930). For example, the circuitry 1930 may enable the apparatus 1905 to obtain an indication of a difference between a first measurement of the first reference signal and a second measurement of a second reference signal associated with a network node.

As shown in FIG. 19, the apparatus 1905 may include, stored in computer-readable medium 1825, code for obtaining an indication of a difference between a first measurement of the first reference signal and a second measurement of a second reference signal associated with a network node (code 1935). For example, the code 1935, when executed by processor 1820, may cause processor 1820 to cause transceiver 1830 to obtain indication of a difference between a first measurement of the first reference signal and a second measurement of a second reference signal associated with a network node.

FIG. 19 is provided as an example. Other examples may differ from what is described in connection with FIG. 19.

The following provides an overview of some Aspects of the present disclosure:

Aspect 1: A method of wireless communication performed at a user equipment (UE), comprising: receiving, via a receive beam, a first reference signal from a first transmission reception point (TRP); receiving, via the receive beam, a second reference signal from a second TRP; and transmitting an indication of a difference between a first measurement of the first reference signal and a second measurement of the second reference signal.

Aspect 2: The method of Aspect 1, wherein the receive beam is a first receive beam; and wherein the method further comprises: receiving, via a second receive beam, the first reference signal from the first TRP; receiving, via the second receive beam, the second reference signal from the second receive beam; and transmitting an indication of a difference between a third measurement of the second reference signal received via the second receive beam and a fourth measurement of the first reference signal received via the second receive beam.

Aspect 3: The method of Aspect 2, wherein the first receive beam is associated with a first antenna module of the apparatus; and wherein the second receive beam is associated with a second antenna module of the apparatus.

Aspect 4: The method of Aspect 2, further comprising: transmitting an indication of the first measurement and an indication of the third measurement.

Aspect 5: The method of any of Aspects 1-4, wherein the first reference signal is received from a first transmit beam of the first TRP; wherein the second reference signal is received from a second transmit beam of the second TRP; and wherein the indication of the difference between the first measurement and the second measurement comprises an indication of cross-beam coupling between the first transmit beam and the second transmit beam.

Aspect 6: The method of Aspect 5, wherein the first transmit beam and the second transmit beam are wide beams.

Aspect 7: The method of Aspect 5, wherein the first transmit beam and the second transmit beam are narrow beams.

Aspect 8: The method of any of Aspects 1-7, wherein the first measurement comprises a first reference signal received power (RSRP) measurement of the first reference signal; and wherein the second measurement comprises a second RSRP measurement of the second reference signal.

Aspect 9: The method of Aspect 8, wherein the difference between the first measurement and the second measurement is quantized to a closest configured reporting value.

Aspect 10: The method of any of Aspects 1-9, wherein selection of the first reference signal and the second reference signal is based at least in part on a user equipment (UE) implementation for the UE.

Aspect 11: The method of any of Aspects 1-10, wherein the difference between the first measurement and the second measurement is based at least in part on a user equipment (UE) implementation for the UE.

Aspect 12: The method of any of Aspects 1-11, wherein the difference between the first measurement and the second measurement is based at least in part on selection of the first reference signal and the second reference signal.

Aspect 13: The method of any of Aspects 1-12, further comprising: transmitting an indication of the first measurement, wherein a measurement error for the first measurement is less than a threshold margin.

Aspect 14: The method of any of Aspects 1-13, wherein the first reference signal is included in a first reference signal set associated with a first plurality of narrow beams of the first TRP; wherein the second reference signal is included in a second reference signal set associated with a second plurality of narrow beams of the second TRP; and wherein the first reference signal set and the second reference signal set are frequency division multiplexed.

Aspect 15: The method of Aspect 14, further comprising: receiving an indication of a quantity of reference signal pairs for cross-beam coupling reporting, wherein each of the reference signal pairs includes one reference signal from the first reference signal set and one reference signal from the second reference signal set.

Aspect 16: A method of wireless communication performed at network node, comprising: transmitting a first reference signal for a user equipment (UE); and receiving, from the UE, an indication of a difference between a first measurement of the first reference signal and a second measurement of a second reference signal associated with a second network node.

Aspect 17: The method of Aspect 16, wherein the difference between the first measurement and the second measurement is associated with a first receive beam of the UE; and wherein the method further comprises: receiving, from the UE, an indication of a difference between a third measurement of the second reference signal and a fourth measurement of the first reference signal, wherein the difference between the third measurement and the fourth measurement is associated with a second receive beam of the UE.

Aspect 18: The method of Aspect 17, further comprising: receiving, from the UE, an indication of the first measurement and an indication of the third measurement.

Aspect 19: The method of any of Aspects 16-18, wherein the first reference signal is associated with a first transmit beam of the first network node; wherein the second reference signal is associated with a second transmit beam of the second network node; and wherein the indication of the difference between the first measurement and the second measurement comprises an indication of cross-beam coupling between the first transmit beam and the second transmit beam.

Aspect 20: The method of Aspect 19, wherein the first transmit beam and the second transmit beam are wide beams.

Aspect 21: The method of Aspect 19, wherein the first transmit beam and the second transmit beam are narrow beams.

Aspect 22: The method of any of Aspects 16-21, wherein the first measurement comprises a first reference signal received power (RSRP) measurement of the first reference signal; and wherein the second measurement comprises a second RSRP measurement of the second reference signal.

Aspect 23: The method of Aspect 22, wherein the difference between the first measurement and the second measurement is quantized to a nearest configured reporting value.

Aspect 24: The method of any of Aspects 16-23, wherein selection of the first reference signal is among a plurality of reference signals transmitted by the first network node on a plurality of transmit beams.

Aspect 25: The method of any of Aspects 16-24, wherein the difference between the first measurement and the second measurement is based at least in part on a UE implementation for the UE.

Aspect 26: The method of any of Aspects 16-25, wherein the difference between the first measurement and the second measurement is based at least in part on the first reference signal and the second reference signal.

Aspect 27: The method of any of Aspects 16-26, further comprising: receiving, from the UE, an indication of the first measurement, wherein a measurement error for the first measurement is less than a threshold margin.

Aspect 28: The method of any of Aspects 16-27, wherein the first reference signal is included in a first reference signal set associated with a first plurality of narrow beams of the first network node; wherein the second reference signal is included in a second reference signal set associated with a second plurality of narrow beams of the second network node; and wherein the first reference signal set and the second reference signal set are frequency division multiplexed.

Aspect 29: The method of Aspect 28, further comprising: transmitting, to the UE, an indication of a quantity of reference signal pairs for which to report cross-beam coupling, wherein each of the reference signal pairs includes one reference signal from the first reference signal set and one reference signal from the second reference signal set.

Aspect 30: A method of wireless communication performed at network node, comprising: providing a first reference signal for a user equipment (UE); and obtaining an indication of a difference between a first measurement of the first reference signal and a second measurement of a second reference signal associated with a second network node.

Aspect 31: The method of Aspect 30, wherein the difference between the first measurement and the second measurement is associated with a first receive beam of the UE; and wherein the method further comprises: obtaining an indication of a difference between a third measurement of the second reference signal and a fourth measurement of the first reference signal, wherein the difference between the third measurement and the fourth measurement is associated with a second receive beam of the UE.

Aspect 32: The method of Aspect 31, further comprising: obtaining an indication of the first measurement and an indication of the third measurement.

Aspect 33: The method of any of Aspects 30-32, wherein the first reference signal is associated with a first transmit beam of the first network node; wherein the second reference signal is associated with a second transmit beam of the second network node; and wherein the indication of the difference between the first measurement and the second measurement comprises an indication of cross-beam coupling between the first transmit beam and the second transmit beam.

Aspect 34: The method of Aspect 33, wherein the first transmit beam and the second transmit beam are wide beams.

Aspect 35: The method of Aspect 33, wherein the first transmit beam and the second transmit beam are narrow beams.

Aspect 36: The method of any of Aspects 30-35, wherein the first measurement comprises a first reference signal received power (RSRP) measurement of the first reference signal; and wherein the second measurement comprises a second RSRP measurement of the second reference signal.

Aspect 37: The method of Aspect 36, wherein the difference between the first measurement and the second measurement is quantized to a nearest configured reporting value.

Aspect 38: The method of any of Aspects 30-37, wherein selection of the first reference signal is among a plurality of reference signals transmitted by the first network node on a plurality of transmit beams.

Aspect 39: The method of any of Aspects 30-38, wherein the difference between the first measurement and the second measurement is based at least in part on a UE implementation for the UE.

Aspect 40: The method of any of Aspects 30-39, wherein the difference between the first measurement and the second measurement is based at least in part on the first reference signal and the second reference signal.

Aspect 41: The method of any of Aspects 30-40, further comprising: obtaining an indication of the first measurement, wherein a measurement error for the first measurement is less than a threshold margin.

Aspect 42: The method of any of Aspects 30-41, wherein the first reference signal is included in a first reference signal set associated with a first plurality of narrow beams of the first network node; wherein the second reference signal is included in a second reference signal set associated with a second plurality of narrow beams of the second network node; and wherein the first reference signal set and the second reference signal set are frequency division multiplexed.

Aspect 43: The method of Aspect 42, further comprising: transmitting, to the UE, an indication of a quantity of reference signal pairs for which to report cross-beam coupling, wherein each of the reference signal pairs includes one reference signal from the first reference signal set and one reference signal from the second reference signal set.

Aspect 44: An apparatus for wireless communication at a device, comprising a processor; memory coupled with the processor; and instructions stored in the memory and executable by the processor to cause the apparatus to perform the method of one or more of Aspects 1-43.

Aspect 45: A device for wireless communication, comprising one or more memories and one or more processors coupled to the one or more memories, the one or more processors configured to perform the method of one or more of Aspects 1-43.

Aspect 46: An apparatus for wireless communication, comprising at least one means for performing the method of one or more of Aspects 1-43.

Aspect 47: A non-transitory computer-readable medium storing code for wireless communication, the code comprising instructions executable by a processor to perform the method of one or more of Aspects 1-43.

Aspect 48: A non-transitory computer-readable medium storing a set of instructions for wireless communication, the set of instructions comprising one or more instructions that, when executed by one or more processors of a device, cause the device to perform the method of one or more of Aspects 1-43.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors coupled to the one or more memories, the one or more processors configured to cause the UE to:

receive, via a receive beam, a first reference signal from a first transmission reception point (TRP);

receive, via the receive beam, a second reference signal from a second TRP; and transmit an indication of a difference between a first measurement of the first reference signal received on the receive beam and a second measurement of the second reference signal received on the receive beam.

2. The apparatus of claim 1, wherein the receive beam is a first receive beam; and wherein the one or more processors are further configured to cause the UE to:

receive, via a second receive beam, the first reference signal from the first TRP;

receive, via the second receive beam, the second reference signal from the second TRP; and transmit an indication of a difference between a third measurement of the second reference signal received via the second receive beam and a fourth measurement of the first reference signal received via the second receive beam.

3. The apparatus of claim 2, wherein the first receive beam is associated with a first antenna module of the apparatus; and wherein the second receive beam is associated with a second antenna module of the apparatus.

4. The apparatus of claim 2, wherein the one or more processors are further configured to cause the UE to:

transmit an indication of the first measurement and an indication of the third measurement.

5. The apparatus of claim 1, wherein the first reference signal is received from a first transmit beam of the first TRP;

wherein the second reference signal is received from a second transmit beam of the second TRP; and wherein the indication of the difference between the first measurement and the second measurement comprises an indication of cross-beam coupling between the first transmit beam and the second transmit beam.

53

54

6. The apparatus of claim 5,
wherein the first transmit beam and the second transmit beam are wide beams or narrow beams.

7. The apparatus of claim 5,
wherein the first transmit beam and the second transmit beam are narrow beams.

8. The apparatus of claim 1,
wherein the first measurement comprises a first reference signal received power (RSRP) measurement of the first reference signal; and
wherein the second measurement comprises a second RSRP measurement of the second reference signal.

9. The apparatus of claim 8,
wherein the difference between the first measurement and the second measurement is quantized to a closest configured reporting value.

10. The apparatus of claim 1,
wherein selection of the first reference signal and the second reference signal is based at least in part on a UE implementation for the apparatus.

11. The apparatus of claim 1,
wherein the difference between the first measurement and the second measurement is based at least in part on a user equipment (UE) implementation for the apparatus.

12. The apparatus of claim 1,
wherein the difference between the first measurement and the second measurement is based at least in part on selection of the first reference signal and the second reference signal.

13. The apparatus of claim 1,
wherein the one or more processors are further configured to cause the UE to:
    transmit an indication of the first measurement,
        wherein a measurement error for the first measurement is less than a threshold margin.

14. The apparatus of claim 1,
wherein the first reference signal is included in a first reference signal set associated with a first plurality of narrow beams of the first TRP;
    wherein the second reference signal is included in a second reference signal set associated with a second plurality of narrow beams of the second TRP; and
    wherein the first reference signal set and the second reference signal set are frequency division multiplexed.

15. The apparatus of claim 14,
wherein the one or more processors are further configured to cause the UE to:
    receive an indication of a quantity of reference signal pairs for cross-beam coupling reporting,
        wherein each of the reference signal pairs includes one reference signal from the first reference signal set and one reference signal from the second reference signal set.

16. A first apparatus for wireless communication at a network node, comprising:
    one or more memories; and
    one or more processors, coupled to the one or more memories, configured to cause the network node to:
        provide a first reference signal for a user equipment (UE); and
        obtain an indication of a difference between a first measurement of the first reference signal, associated with a receive beam of the UE and a second measurement of a second reference signal, associated with the receive beam of the UE.

17. The first apparatus of claim 16,
wherein the difference between the first measurement and the second measurement is associated with a first receive beam of the UE; and
    wherein the one or more processors are further configured to cause the network node to:
        obtain an indication of a difference between a third measurement of the second reference signal and a fourth measurement of the first reference signal,
            wherein the difference between the third measurement and the fourth measurement is associated with a second receive beam of the UE.

18. The first apparatus of claim 17,
wherein the one or more processors are further configured to cause the network node to:
    obtain an indication of the first measurement and an indication of the third measurement.

19. The first apparatus of claim 16,
wherein the first reference signal is associated with a first transmit beam of the first apparatus;
    wherein the second reference signal is associated with a second transmit beam of the UE; and
    wherein the indication of the difference between the first measurement and the second measurement comprises an indication of cross-beam coupling between the first transmit beam and the second transmit beam.

20. The first apparatus of claim 16,
wherein the first measurement comprises a first reference signal received power (RSRP) measurement of the first reference signal; and
    wherein the second measurement comprises a second RSRP measurement of the second reference signal.

21. The first apparatus of claim 20,
wherein the difference between the first measurement and the second measurement is quantized to a nearest configured reporting value.

22. The first apparatus of claim 16,
wherein selection of the first reference signal is among a plurality of reference signals transmitted by the first apparatus on a plurality of transmit beams.

23. The first apparatus of claim 16,
wherein the difference between the first measurement and the second measurement is based at least in part on selection of the first reference signal and the second reference signal.

24. The first apparatus of claim 16,
wherein the one or more processors are further configured to cause the network node to:
    obtain an indication of the first measurement,
        wherein a measurement error for the first measurement is less than a threshold margin.

25. The first apparatus of claim 16,
wherein the first reference signal is included in a first reference signal set associated with a first plurality of narrow beams of the first apparatus;
    wherein the second reference signal is included in a second reference signal set associated with a second plurality of narrow beams of the UE; and
    wherein the first reference signal set and the second reference signal set are frequency division multiplexed.

26. The first apparatus of claim 25,
wherein the one or more processors are further configured to cause the network node to:
    provide an indication of a quantity of reference signal pairs for which to report cross-beam coupling, wherein each of the reference signal pairs includes one reference signal from the first reference signal set and one reference signal from the second reference signal set.

27. A method of wireless communication performed at a user equipment (UE), comprising:

receiving, via a receive beam, a first reference signal from a first transmission reception point (TRP);

receiving, via the receive beam, a second reference signal from a second TRP; and transmitting an indication of a difference between a first measurement of the first reference signal received on a receive beam and a second measurement of a second reference signal received on the receive beam.

28. The method of claim 27, wherein the receive beam is a first receive beam; and wherein the method further comprises:

receiving, via a second receive beam, the first reference signal from the first TRP;

receiving, via the second receive beam, the second reference signal from the second TRP; and transmitting an indication of a difference between a third measurement of the second reference signal received via the second receive beam and a fourth measurement of the first reference signal received via the second receive beam.

29. A method of wireless communication performed at a first network node, comprising:

providing a first reference signal for a user equipment (UE); and obtaining an indication of a difference between a first measurement of the first reference signal, associated with a receive beam of the UE, and a second measurement of a second reference signal, associated with the receive beam of the UE.

30. The method of claim 29, wherein the difference between the first measurement and the second measurement is associated with a first receive beam of the UE; and wherein the method further comprises:

receiving, from the UE, an indication of a difference between a third measurement of the second reference signal and a fourth measurement of the first reference signal, wherein the difference between the third measurement and the fourth measurement is associated with a second receive beam of the UE.

* * * * *